(12) United States Patent
Koga et al.

(10) Patent No.: US 11,863,036 B2
(45) Date of Patent: Jan. 2, 2024

(54) ARMATURE AND MANUFACTURING METHOD OF ARMATURE

(71) Applicant: AISIN CORPORATION, Kariya (JP)

(72) Inventors: Kiyotaka Koga, Nishio (JP); Takahiro Kobuchi, Kariya (JP); Takashi Kato, Anjo (JP)

(73) Assignee: AISIN CORPORATION, Kariya (JP)

( * ) Notice: Subject to any disclaimer, the term of this patent is extended or adjusted under 35 U.S.C. 154(b) by 478 days.

(21) Appl. No.: 17/273,005

(22) PCT Filed: Oct. 9, 2019

(86) PCT No.: PCT/JP2019/039908
§ 371 (c)(1),
(2) Date: Mar. 3, 2021

(87) PCT Pub. No.: WO2020/095609
PCT Pub. Date: May 14, 2020

(65) Prior Publication Data
US 2021/0351653 A1 Nov. 11, 2021

(30) Foreign Application Priority Data
Nov. 9, 2018 (JP) ................................. 2018-211517

(51) Int. Cl.
*H02K 3/28* (2006.01)
*H02K 15/00* (2006.01)

(52) U.S. Cl.
CPC ........... *H02K 3/28* (2013.01); *H02K 15/0081* (2013.01)

(58) Field of Classification Search
CPC ............................ H02K 3/28; H02K 15/0081
See application file for complete search history.

(56) References Cited

U.S. PATENT DOCUMENTS

| 10,250,093 | B2 | 4/2019 | Hattori | |
|---|---|---|---|---|
| 2011/0278973 | A1* | 11/2011 | Utaka | H02K 3/28 310/71 |
| 2015/0372551 | A1* | 12/2015 | Hashimoto | H02K 3/50 310/71 |
| 2016/0006314 | A1* | 1/2016 | Kaneshige | H02K 3/50 310/71 |
| 2016/0190884 | A1* | 6/2016 | Nakamura | H02K 3/50 310/208 |

FOREIGN PATENT DOCUMENTS

JP 2015-023771 A 2/2015

OTHER PUBLICATIONS

Dec. 24, 2019 International Search Report issued in International Patent Application No. PCT/JP2019/039908.

* cited by examiner

*Primary Examiner* — Jue Zhang
(74) *Attorney, Agent, or Firm* — Oliff PLC

(57) ABSTRACT

In this armature, between the first segment conductor and the second segment conductor that are joined to each other in the joint portion, a first clearance portion is provided between the tip end portion of the first leg portion and the second leg portion body portion in the axial direction, and a second clearance portion is provided between the tip end portion of the second leg portion and the first leg portion body portion in the axial direction.

14 Claims, 22 Drawing Sheets

ARMATURE AND MANUFACTURING METHOD OF ARMATURE

TECHNICAL FIELD

The present disclosure relates to an armature and a manufacturing method of the armature.

BACKGROUND ART

Conventionally, an armature having an armature core provided with a plurality of slots extending in a central axis direction and a manufacturing method of the armature have been known. Such an armature and a manufacturing method of the armature are disclosed in, for example, Japanese Unexamined Patent Application Publication No. 2015-23771 (JP 2015-23771 A).

JP 2015-23771 A, described above, discloses a rotary electric machine stator including a plurality of slots. The rotary electric machine stator includes a coil portion composed of a first conductor segment and a second conductor segment that are inserted into each of the plurality of slots and that are provided so as to face each other in the central axis direction. Specifically, the first segment conductor and the second segment conductor are inserted into the slot from one side and the other side in the central axis direction, respectively. Further, in each of the plurality of slots, facing surfaces provided at tips of leg portions of the first conductor segment and the second conductor segment are joined by a conductive paste binder.

In JP 2015-23771 A described above, when joining the facing surfaces using the binder, the first segment conductor and the second segment conductor are pressurized in the central axis direction and pressed against each other while the binder is heated. As a result, since the pre-applied paste binder is melted by heat and each of the first segment conductor and the second segment conductor is pressurized in a state in which the binder is melted, the first segment conductor and the second segment conductor are joined. Since the binder is cured in the end, the facing surfaces of the leg portions of the first segment conductor and the second segment conductor are joined to each other.

RELATED ART DOCUMENTS

Patent Documents

Patent Document 1: Japanese Unexamined Patent Application Publication No. 2015-23771 (JP 2015-23771 A)

SUMMARY OF THE DISCLOSURE

Problem to be Solved by the Invention

However, although not specified in JP 2015-23771 A described above, in the rotary electric machine stator, there is a case in which the first segment conductor and the second segment conductor is inserted in the slot, in a state in which the heights of the coil end portions are aligned between the plurality of first segment conductors, and the heights of the coil end portions are aligned between the plurality of second segment conductors. Here, dimensional variation may occur due to a design error between the plurality of first segment conductors and between the plurality of second segment conductors. In this case, when the insertion is performed with the heights of the coil ends aligned with each other, the leg portion having a relatively large length due to dimensional variation is brought into contact with the leg portion to be joined with. However, a case occurs in which the leg portion with a relatively small length is not brought into contact with the leg portion to be joined with. Specifically, since the insertion of the segment conductor is stopped after the set having the largest total length of the leg portions joined to each other is brought into contact, sets other than the above set of leg portions are not brought into contact. In this case, there is a problem that it is difficult to secure the joining area between the leg portions of the first segment conductor and the second segment conductor.

The present disclosure has been made to solve the problems described above. An object of the present disclosure is to provide an armature and manufacturing method of an armature, in which the armature can ensure a joining area of leg portions while making a protrusion amount of coil end portions uniform, even when there is a dimension variation in a segment conductor.

Means for Solving the Problem

In order to achieve the object described above, an armature according to a first aspect of the disclosure includes: an armature core provided with a plurality of slots extending in an axial direction; a plurality of first segment conductors disposed on one side of the armature core in the axial direction and including a first leg portion that extends to the other side of the armature core in the axial direction; a plurality of second segment conductors disposed on the other side of the armature core in the axial direction and including a second leg portion that extends to the one side in the axial direction; and a coil portion including a joint portion in which a first surface that is provided on a tip end portion side of each first leg portion of the plurality of first segment conductors and that is provided so as to extend along the axial direction, and a second surface that is provided on a tip end portion side of each second leg portion of the plurality of second segment conductors and that is provided so as to extend along the axial direction are joined in one of the slots or on an outer side of one of the slots in the axial direction, in which the first leg portion has a first leg portion body portion that is provided so as to be continuous from a first surface disposition portion on which the first surface is provided and on an opposite side of the first leg portion from the tip end portion, and that has a thickness in a joining direction, which is a direction in which the first surface and the second surface are joined, larger than a thickness of the first surface disposition portion, the second leg portion has a second leg portion body portion that is provided so as to be continuous from a second surface disposition portion on which the second surface is provided and on an opposite side of the second leg portion from the tip end portion, and that has a thickness in the joining direction larger than a thickness of the second surface disposition portion, and between the first segment conductor and the second segment conductor that are joined to each other in the joint portion, a first clearance portion is provided between the tip end portion of the first leg portion and the second leg portion body portion in the axial direction, and a second clearance portion is provided between the tip end portion of the second leg portion and the first leg portion body portion in the axial direction. The term "joining" has a broad meaning including not only a state of being joined via a binder (joining material) but also a state of being only in contact without interposing a binder (joining material).

In the armature according to a first aspect of the disclosure, as described above, the first clearance portion is provided between the tip end portion of the first leg portion and the second leg portion body portion in the axial direction, and the second clearance portion is provided between the tip end portion of the second leg portion and the first leg portion body portion in the axial direction. As a result, even if there is a dimensional variation that occurs while manufacturing the first segment conductor and the second segment conductor, the above variation can be absorbed by the first clearance portion and the second clearance portion. As a result, the following case can be prevented: the tip end portion of the conductor that is manufactured to have a relatively large dimension, among the plurality of first segment conductors and the second segment conductors, is in contact with the conductor to be joined with and thus, movement of the other first segment conductors and the second segment conductors in the axial direction is stopped. As a result, even when the height of each of the coil end portions of the first segment conductor and the second segment conductor are aligned, the conductors that are manufactured to have relatively small dimensions, among the first segment conductor and the second segment conductor, can be easily brought into contact with the conductors to be joined with, in the joint portion. As a result, even when there is a variation in the dimensions of the first segment conductor and the second segment conductor, it is possible to ensure a joining area of the first leg portion and the second leg portion while making the protrusion amount of each coil end portion of the first segment conductor and the second segment conductor uniform.

A manufacturing method of an armature according to a second aspect of the disclosure is a manufacturing method of an armature that includes an armature core provided with a plurality of slots extending in an axial direction, a plurality of first segment conductors including a first leg portion extending in the axial direction, and a plurality of second segment conductors including a second leg portion extending in the axial direction, the manufacturing method including: a step of disposing each of the plurality of first segment conductors on one side of the armature core in the axial direction and disposing each of the plurality of second segment conductors on the other side of the armature core in the axial direction such that a first surface that is provided on a tip end portion side of each of the first leg portions of the plurality of first segment conductors and that is provided so as to extend along the axial direction and a second surface that is provided on a tip end portion side of each of the second leg portions of the plurality of second segment conductors and that is provided so as to extend along the axial direction face each other in one slot or on an outer side of the one slot in the axial direction; and a step of joining the first surface of the first leg portion and the second surface of the second leg portion that are disposed so as to face each other, in which the first leg portion has a first leg portion body portion that is provided so as to be continuous from a first surface disposition portion on which the first surface is provided and on an opposite side of the first leg portion from the tip end portion, and that has a thickness in a joining direction, which is a direction in which the first surface and the second surface are joined, larger than a thickness of the first surface disposition portion, the second leg portion has a second leg portion body portion that is provided so as to be continuous from a second surface disposition portion on which the second surface is provided and on an opposite side of the second leg portion from the tip end portion, and that has a thickness in the joining direction larger than a thickness of the second surface disposition portion, and the step of disposing the first segment conductor and the second segment conductor is a step of disposing the first segment conductor and the second segment conductor so that a first clearance portion is provided between the tip end portion of the first leg portion and the second leg portion body portion in the axial direction and so that a second clearance portion is provided between the tip end portion of the second leg portion and the first leg portion body portion in the axial direction.

In a manufacturing method of an armature according to a second aspect of the disclosure, as described above, the first segment conductor and the second segment conductor are disposed so that the first clearance portion is provided between the tip end portion of the first leg portion and the second leg portion body portion in the axial direction, and the second clearance portion is provided between the tip end portion of the second leg portion and the first leg portion body portion in the axial direction. As a result, even if there is a dimensional variation that occurs while manufacturing the first segment conductor and the second segment conductor, the above variation can be absorbed by the first clearance portion and the second clearance portion. As a result, the following case can be prevented: the tip end portion of the conductor that is manufactured to have a relatively large dimension, among the plurality of first segment conductors and the second segment conductors, is in contact with the conductor to be joined with and thus, movement of the other first segment conductors and the second segment conductors in the axial direction is stopped. As a result, even when the height of each of the coil end portions of the first segment conductor and the second segment conductor are aligned, the conductors that are manufactured to have relatively small dimensions, among the first segment conductor and the second segment conductor, can be easily brought into contact with the conductors to be joined with, in the joint portion. As a result, it is possible to provide a manufacturing method of an armature, in which even when there is a variation in the dimensions of the first segment conductor and the second segment conductor, it is possible to ensure a joining area of the first leg portion and the second leg portion while making the protrusion amount of each coil end portion of the first segment conductor and the second segment conductor uniform.

Effects of the Disclosure

According to the present disclosure, even when variation occurs in the dimensions of the segment conductors as described above, it is possible to secure the joining area of the leg portions while making the protrusion amount of the coil end portions uniform.

BRIEF DESCRIPTION OF THE DRAWINGS

FIG. 7 is a perspective view showing a configuration of a first segment conductor according to the first embodiment.

FIG. 8 is a perspective view showing a configuration of a second segment conductor according to the first embodiment.

FIG. 25 is a perspective view showing a configuration of a first segment conductor according to the second embodiment.

FIG. 26 is a perspective view showing a configuration of a second segment conductor according to the second embodiment.

FIG. 34 is a perspective view of the first segment conductor and the second segment conductor according to a third modification of the first and second embodiments.

MODES FOR CARRYING OUT THE DISCLOSURE

Hereinafter, an embodiment of the present disclosure will be described with reference to the drawings.

First Embodiment

[Structure of Stator]

The structure of a stator 100 according to the first embodiment will be described with reference to FIGS. 1 to 21. The stator 100 has an annular shape centered around a central axis C1. The stator 100 is an example of an "armature" in the claims.

Figure 1:
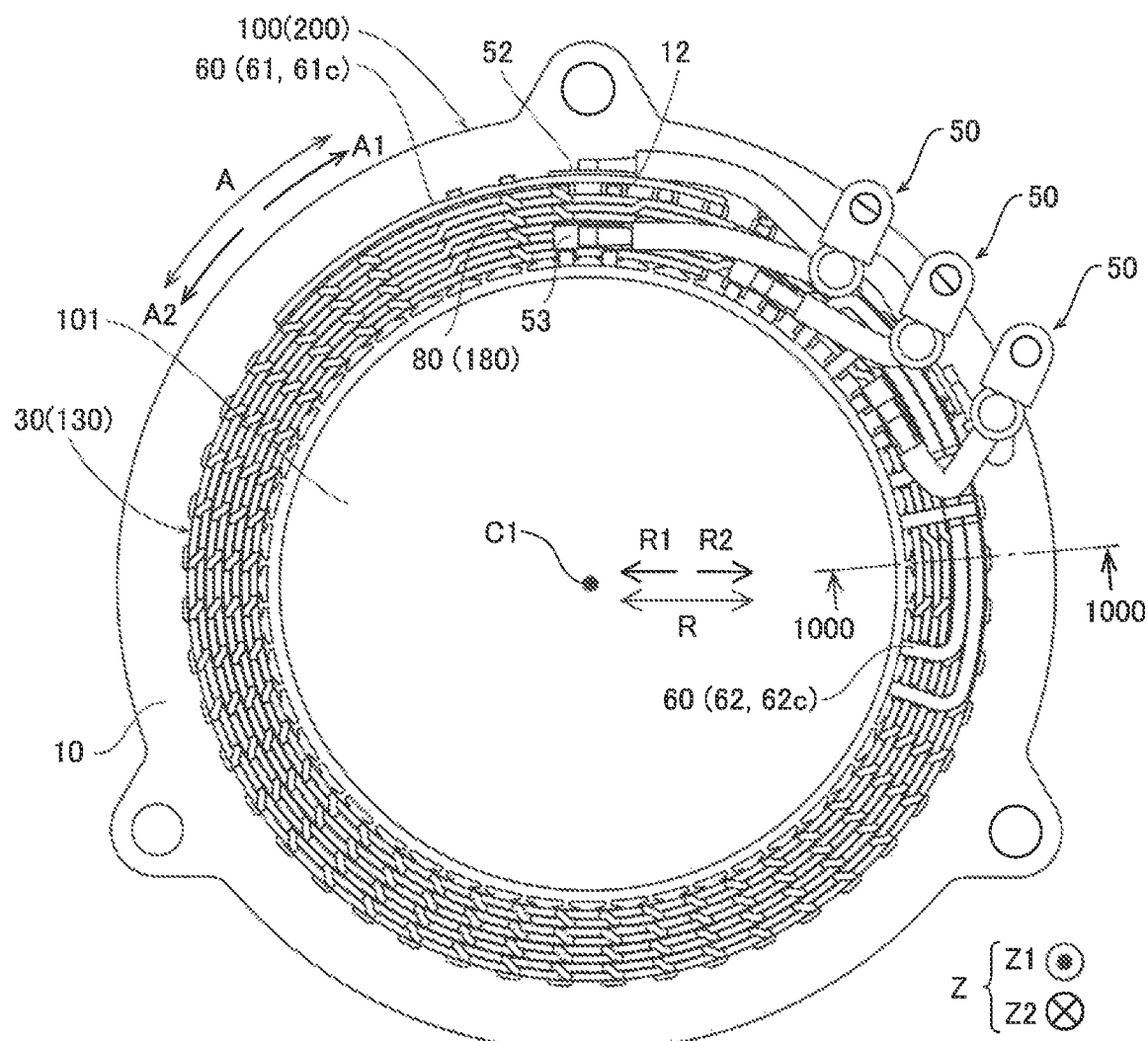
FIG. 1 is a plan view showing a configuration of a stator (rotary electric machine) according to first and second embodiments.

In the specification of the application, an "axial direction (central axis direction, axis direction)" means a direction (Z direction) along the central axis C1 of the stator 100 (a rotational axis of a rotor 101) as shown in FIG. 1. A "circumferential direction" means a circumferential direction (A1 direction, A2 direction) of the stator 100. A "radial direction" means a radial direction (R direction) of the stator 100. An "inner radial side" means a direction (R1 direction) toward the central axis C1 of the stator 100 along the radial direction. Further, an "outer radial side" means a direction (R2 direction) toward the outside of the stator 100 along the radial direction.

The stator 100 configures a part of a rotary electric machine 102 together with the rotor 101. The rotary electric machine 102 is configured as a motor, a generator, or a motor/generator, for example. As shown in FIG. 1, the stator 100 is disposed on the outer radial side of the rotor 101 in which a permanent magnet (not shown) is provided. That is, in the first embodiment, the stator 100 configures a part of the inner rotor type rotary electric machine 102. The radial direction is an example of a "joining direction" in the claims.

Figure 2:
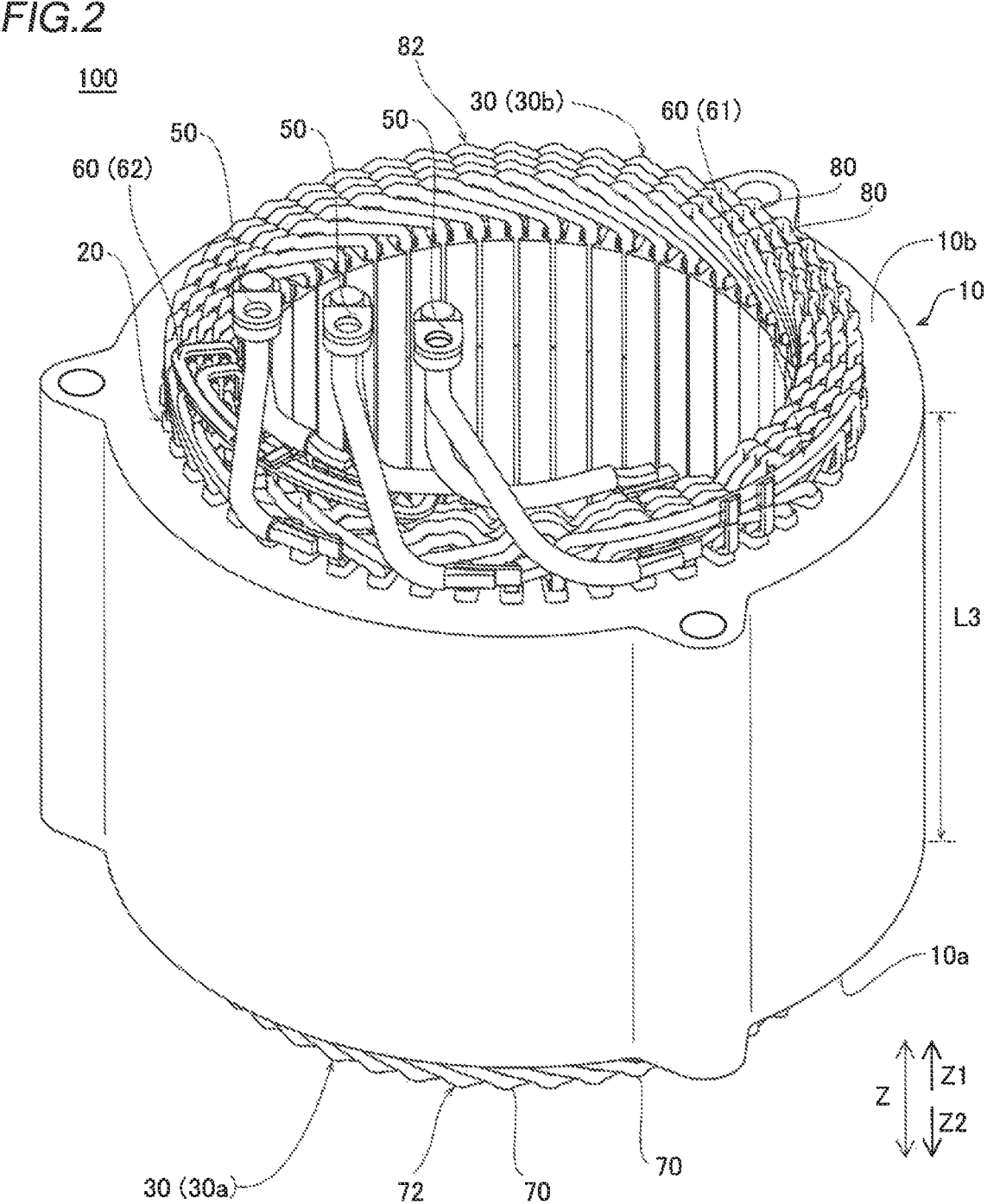
FIG. 2 is a perspective view showing the configuration of the stator according to the first embodiment.

As shown in FIG. 2, the stator 100 includes a stator core 10, a first insulating member 20, and a coil portion 30. The coil portion 30 includes a first coil assembly 30a (non-lead side coil) and a second coil assembly 30b (lead side coil). Further, the coil portion 30 is composed of a plurality of segment conductors 40 (see FIG. 4). In addition, in the first embodiment, the stator 100 includes a second insulating member 21 (see FIG. 4) that is provided separately from the first insulating member 20. The stator core 10 is an example of an "armature core" in the claims. The second insulating member 21 is an example of a "joint portion insulating member" in the claims.

(Structure of Stator Core)

Figure 3:
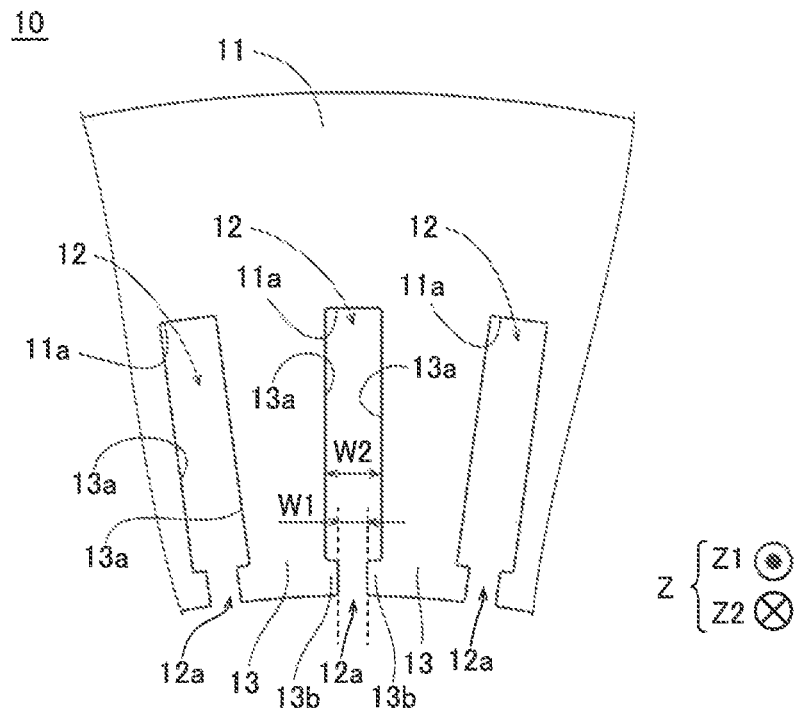
FIG. 3 is a plan view showing a configuration of a stator core according to the first and second embodiments.

The stator core 10 has a cylindrical shape with the central axis C1 (see FIG. 1) as the central axis. Further, the stator core 10 is formed, for example, by stacking a plurality of electromagnetic steel plates (for example, silicon steel plates) in the axial direction. As shown in FIG. 3, the stator core 10 is provided with a back yoke 11 having an annular shape when viewed in the axial direction, and a plurality of slots 12 that is provided on the inner radial side of the back yoke 11 and that extends in the axial direction. The stator core 10 is provided with a plurality of teeth 13 on both sides of each slot 12 in the circumferential direction.

Each slot 12 is a part surrounded by a wall portion 11$a$ of the back yoke 11 provided on the outer radial side and circumferential side surfaces 13$a$ of the two teeth 13. The slot 12 is provided with an opening portion 12$a$ that opens to the inner radial side. The slot 12 opens on both sides in the axial direction. The teeth 13 are formed so as to protrude radially inward from the back yoke 11, and a protruding portion 13$b$ configuring an opening portion 12$a$ of the slot 12 is formed on a tip end portion on the inner radial side.

The opening portion 12$a$ has an opening width W1 in the circumferential direction. Here, the opening width W1 corresponds to the distance between the tip end portions of the protruding portions 13$b$ of the teeth 13. A width W2 of a part of the slot 12 in which the coil portion 30 is disposed is larger than the opening width W1. That is, the slot 12 is configured as a semi-open type slot. Here, the width W2 corresponds to the distance between the circumferential side surfaces 13$a$ of the teeth 13 disposed on both sides of the slot 12 in the circumferential direction. The width W2 of the slot 12 is substantially constant in the radial direction.

(Structure of Coil Portion)

Figure 4:
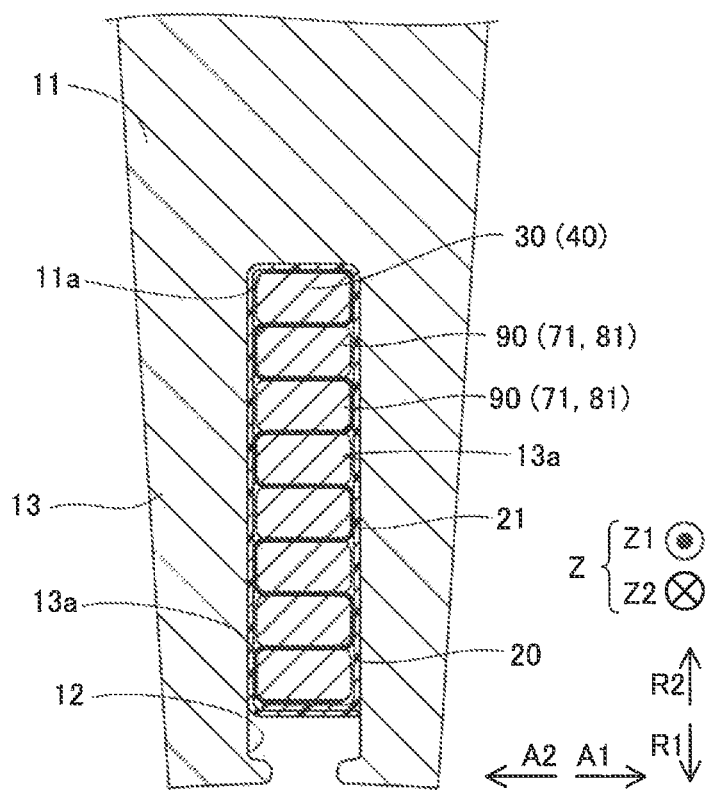
FIG. 4 is a sectional view showing a configuration of a first insulating member and a second insulating member according to the first embodiment.

As shown in FIG. 4, the coil portion 30 is configured of a flat conductor wire. For example, the coil portion 30 is made of copper or aluminum.

As shown in FIG. 2, the coil portion 30 is formed by the first coil assembly 30$a$ provided on one axial side (arrow Z2 direction side) and the second coil assembly 30$b$ provided on the other axial side (arrow Z1 direction side) being combined in the axial direction and joined. The first coil assembly 30$a$ and the second coil assembly 30$b$ are each formed in an annular shape centered around the same central axis C1 (see FIG. 1) as the stator core 10. As shown in FIG. 4, in the first embodiment, the coil portion 30 is formed by joining in a joint portion 90, a first leg portion 71 and a second leg portion 81, described below, of the segment conductors 40.

The coil portion 30 is configured as a wave winding coil, for example. Moreover, the coil portion 30 is configured as a coil of eight turns. That is, the coil portion 30 is configured such that eight segment conductors 40 are disposed in parallel in the slot 12 in the radial direction.

<Configuration of Wiring Connection of Coil Portion>

Figure 5:
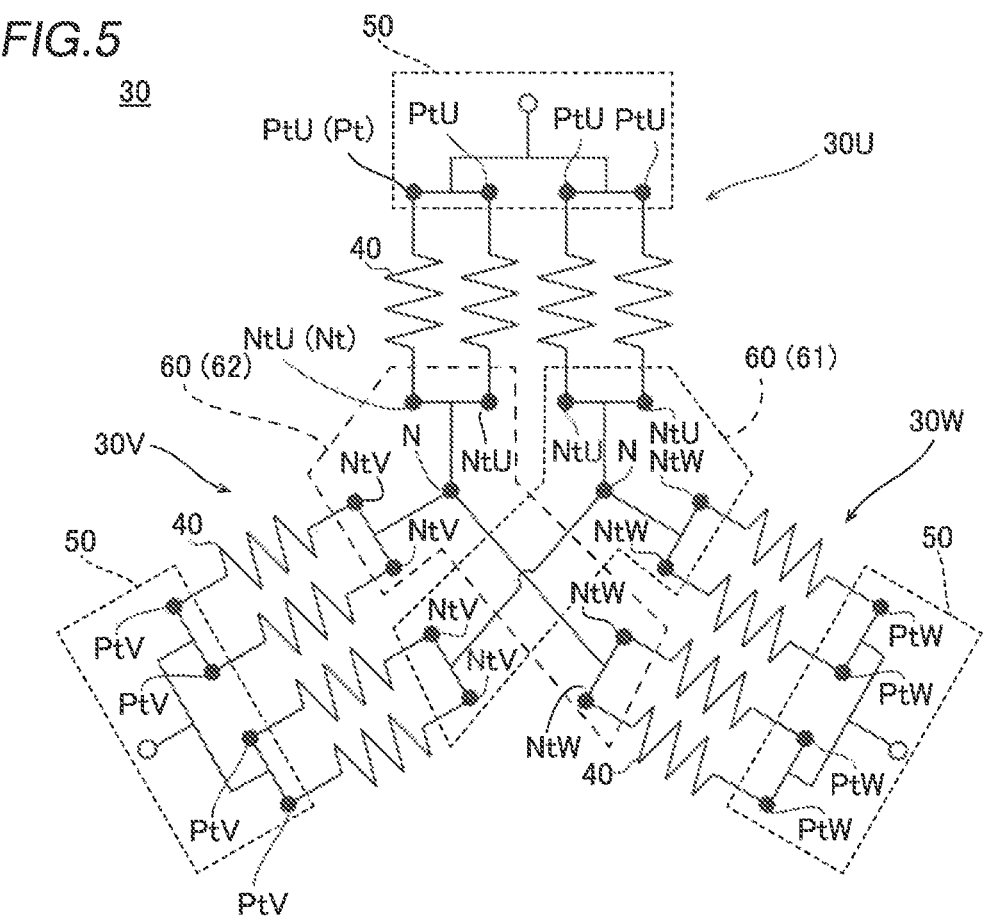
FIG. 5 is a circuit diagram showing a wiring configuration of a coil portion according to the first embodiment.

As shown in FIG. 5, the coil portion 30 is configured to generate magnetic flux by being supplied with three-phase alternating current power from a power supply unit (not shown). Specifically, the coil portions 30 are connected (wired) by three-phase Y-connection. That is, the coil portion 30 includes a U-phase coil portion 30U, a V-phase coil portion 30V, and a W-phase coil portion 30W. The coil portion 30 is provided with a plurality of (for example, two) neutral points N. Specifically, the coil portion 30 is connected in four parallel lines (star connection). That is, the U-phase coil portion 30U is provided with four neutral point connection end portions NtU and four power line connection end portions PtU. The V-phase coil portion 30V is provided with four neutral point connection end portions NtV and four power line connection end portions PtV. The W-phase coil portion 30W is provided with four neutral point connection end portions NtW and four power line connection end portions PtW. In the following description, when the U-phase, the V-phase, and the W-phase are not particularly distinguished for the neutral point connection end portion and the power line connection end portion, the neutral point connection end portion and the power line connection end portion are simply indicated as a "neutral point connection end portion Nt" and a "power line connection end portion Pt".

<Configuration of Coil Assembly>

As shown in FIG. 2, the first coil assembly 30$a$ is configured of a plurality of first segment conductors 70 (hereinafter, referred to as "first conductors 70") serving as the segment conductors 40. It is preferable that the first coil assembly 30$a$ be configured by combining only the first conductors 70.

The second coil assembly 30$b$ includes a plurality of (for example, three) power segment conductors 50 (hereinafter, referred to as "power conductors 50") serving as the segment conductors 40, and a plurality of (for example, two) neutral-point segment conductors 60 (hereinafter referred to as "neutral-point conductors 60") serving as the segment conductors 40, and second segment conductors 80 (hereinafter, referred to as "second conductors 80") that are conductors (general segment conductors 40) different from the power conductors 50 and the neutral-point conductors 60 among the segment conductors 40 and that configure the coil portion 30. That is, all of the power conductors 50 and the neutral point conductors 60 provided in the stator 100 are provided in the second coil assembly 30$b$.

(Configuration of Segment Conductor)

Figure 6:
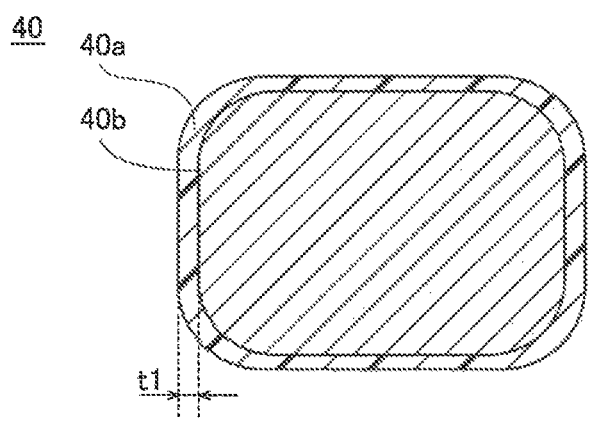
FIG. 6 is a cross-sectional view showing a configuration of a segment conductor according to the first embodiment.

As shown in FIG. 6, the segment conductor 40 is configured as a flat conductor wire having a substantially rectangular cross section. An insulating coating 40$a$ having a thickness t1 is provided on a conductor surface 40$b$ of the segment conductor 40. The thickness t1 of the insulating coating 40$a$ is set, for example, to such an extent that interphase insulating performance (insulation between the first coil end portions 72 and insulation between the second coil end portions 82, see FIG. 2) can be ensured. Note that, in FIG. 6, the size relationship such as the thickness is highlighted for the sake of explanation, and the present disclosure is not limited to this example indicated in the drawing.

<Structure of First Conductor and Second Conductor>

As shown in FIGS. 7 and 8 the segment conductors 40 include the first conductors 70 disposed on one axial side (Z2 direction side) of the stator core 10 and the second conductors 80 that are disposed on the other axial side (Z1 direction side) of the stator core 10 and that face the first conductors 70 in the axial direction. That is, the coil portion 30 is formed by joining the first conductors 70 and the second conductors 80, which are divided into two in the axial direction. Here, the second conductors 80 are the segment conductors 40 other than the power conductors 50 and the neutral point conductors 60 among the segment conductors 40 that configure the second coil assembly 30$b$. In the first embodiment, each first conductor 70 includes the first leg portion 71 which extends in the axial direction and which has a length L1 in the axial direction. The first leg portion 71 extends to the other side (Z1 direction side) in the axial direction. Each second conductor 80 includes the second leg portion 81 that is disposed on the Z1 direction side of the first leg portion 71, that extends in the axial direction, and that has a length L2 that is greater than the length L1 in the axial direction. The second leg portion 81 extends to one side (Z2 direction side) in the axial direction.

Figure 7A:
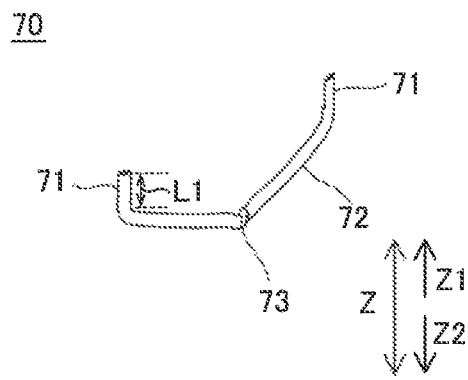
(FIG. 7A is a perspective view of the first segment conductor viewed from an outer radial side.
Figure 7B:
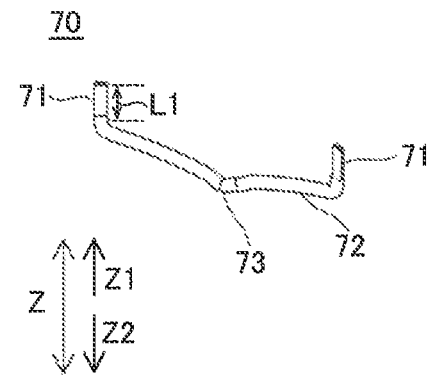
FIG. 7B is a perspective view of the first segment conductor viewed from an inner radial side.)

In the first embodiment, as shown in FIGS. 7A and 7B, the first conductors 70 are formed so as to have a U-shape (substantially U-shape) when viewed in the radial direction by connecting a pair of the first leg portions 71 in which the first leg portions 71 are disposed in the slots 12 different from each other. The coil pitch of the first conductors 70 is six. That is, the first leg portions 71 of the pair of first leg portions 71 are disposed at positions different in the circumferential direction by six slots 12. That is, five slots 12 are provided between the slot 12 in which one first leg portion 71 of the pair of first leg portions 71 is disposed and the slot 12 in which the other first leg portion 71 of the pair of first leg portions 71 is disposed. Specifically, each first conductor 70 includes the pair of the first leg portions 71 that are disposed in different slots 12 and that are each linearly formed along the axial direction, and a first coil end portion 72. The first leg portion 71 means a part disposed in the slot 12 from the axial position of the end face 10*a* (see FIG. 2) in the axial direction of the stator core 10, and the first coil end portion 72 means a part that is formed to be continuous with the first leg portion 71 and that is disposed on the outer axial side of the end face 10*a* of the stator core 10. The first coil end portion 72 has a bent shape that bends in the axial direction. Further, the first coil end portion 72 has a first crank part 73 formed in a crank shape in which the first crank part 73 is bent in a stepwise manner by the width of one segment conductor 40 in the radial direction when viewed in the axial direction. That is, the radial width of the first crank part 73 is twice the width of one segment conductor 40. The end face 10*a* is an example of a "one side end face" in the claims.

Further, the lengths L1 of the pair of first leg portions 71 in the axial direction are substantially equal to each other. The length L1 in the axial direction means the length of the part of the first conductor 70 that extends linearly in the axial direction within the slot 12. The length L1 in the axial direction is smaller than a length L3 of the stator core 10 in the axial direction (see FIG. 2). The length L3 of the stator core 10 in the axial direction means an axial distance (interval) between the end face 10*a* and the end face 10*b* in the axial direction. Further, the end face 10*b* is an example of the "other end face" in the claims.

Figure 8A:
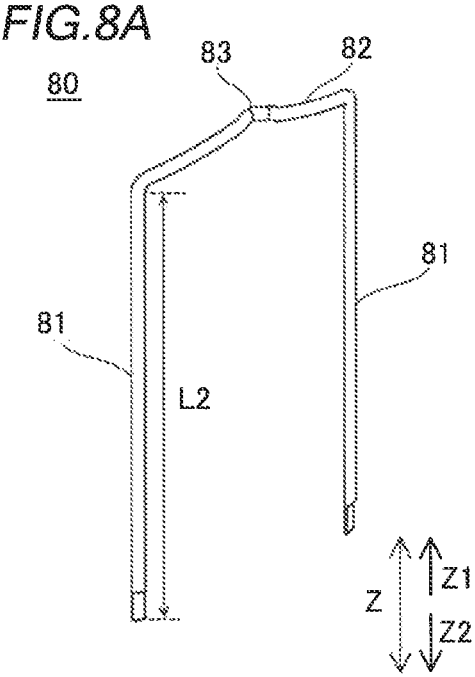
(FIG. 8A is a perspective view of the second segment conductor viewed from the outer radial side.
Figure 8B:
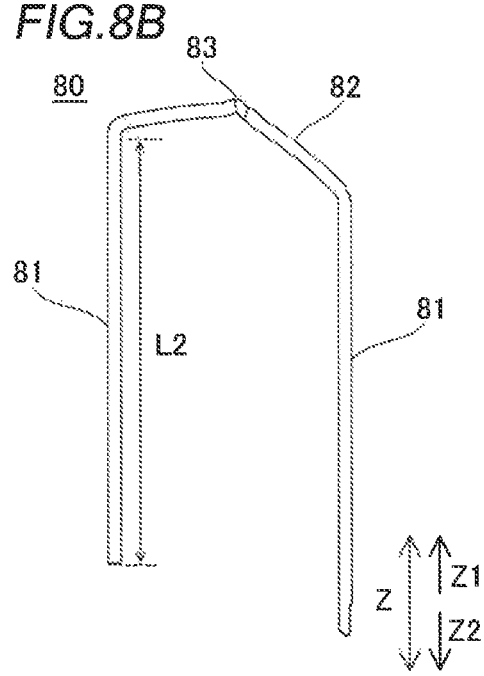
FIG. 8B is a perspective view of the second segment conductor viewed from the inner radial side.)

Similarly, as shown in FIGS. 8A and 8B, the second conductor 80 includes a pair of the second leg portions 81 disposed in the slot 12 and the second coil end portion 82. The second coil end portion 82 also has a second crank part 83. In the first embodiment, the second conductor 80 is formed to have a U-shape by connecting the pair of second leg portions 81, which is disposed in the different slots 12, to each other. The axial lengths L2 of the pair of second leg portions 81 of the second conductor 80 are substantially equal to each other. Further, the axial length L2 of the pair of second leg portions 81 of the second conductor 80 is larger than the axial length L1 of the pair of first leg portions 71 of the first conductor 70 (L2>L1). The axial length L2 means the length of the part of the second conductor 80 that extends linearly in the axial direction within the slot 12.

<Configuration of Power Conductor>

Figure 9:
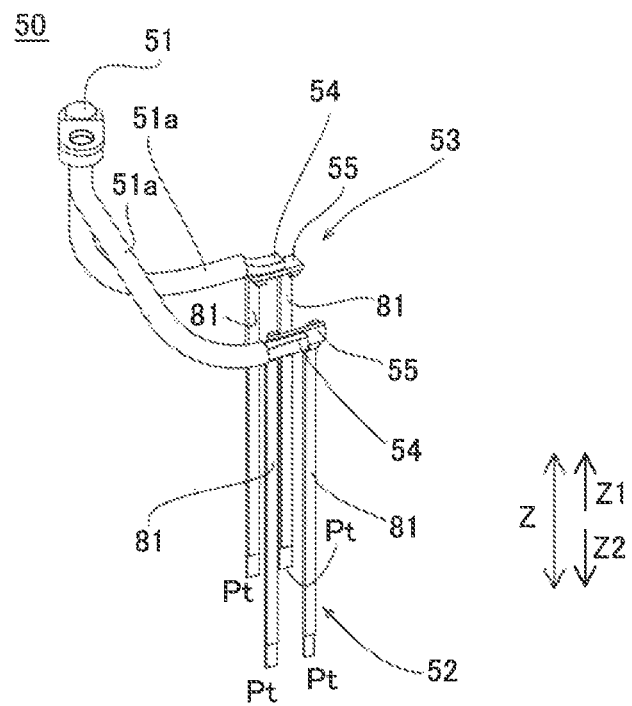
FIG. 9 is a figure showing a configuration of a power segment conductor according to the first embodiment.

As shown in FIG. 9, in the power conductor 50, a plurality (for example, four) of the power line connection end portions Pt of the same phase are electrically connected to each other, and a plurality of the connected power line connection end portions Pt and one power terminal member 51 are electrically connected. In the power conductor 50, the second leg portion 81 joined to one of the pair of first leg portions 71 (see FIG. 12) and the power terminal member 51 are joined. The power conductor 50 has a function of introducing electric power into the coil portion 30 from the power supply unit (not shown).

Specifically, the power conductor 50 includes an outer radial side power conductor 52 that is disposed on the outer radial side of the slot 12 (see FIG. 1) and that has the power line connection end portion Pt, and an inner radial side power conductor 53 that is disposed on the inner radial side and the outer axial side of the outer radial side power conductor 52 and that has the power line connection end portion Pt. In other words, the power conductor 50 is formed in a bifurcated shape.

The outer radial side power conductor 52 and the power terminal member 51 are electrically connected by a lead wire 54. The inner radial side power conductor 53 and the power terminal member 51 are electrically connected to each other by the lead wire 54. The outer radial side power conductor 52 and the inner radial side power conductor 53 are electrically connected via the power terminal member 51 and the lead wire 54. The lead wire 54 is formed of a stranded wire (conductor) and an insulating tube 51*a* is disposed on the outer circumference, for example.

The outer radial side power conductor 52 and the inner radial side power conductor 53 are each provided with the second leg portion 81 but are not provided with the first coil end portion 72 or the second coil end portion 82. Further, in the outer radial side power conductor 52 and the inner radial side power conductor 53, the lead wire 54 and the second leg portion 81 are joined via a conductor plate 55. For example, the joining is performed by brazing or welding (for example, any one of resistance welding, arc welding, laser welding, or high energy beam welding).

<Structure of Neutral Point Conductor>

As shown in FIG. 1, the neutral point conductor 60 includes an outer radial side neutral point conductor 61 and an inner radial side neutral point conductor 62. As shown in FIG. 5, the outer radial side neutral point conductor 61 and the inner radial side neutral point conductor 62 each include the neutral point N, and the neutral point connection end portion NtU of the U-phase coil portion 30U, the neutral point connection end portion NtV of the V-phase coil portion 30V, and the neutral point connection end portion NtW of the W-phase coil portion 30W are electrically connected.

Figure 10:
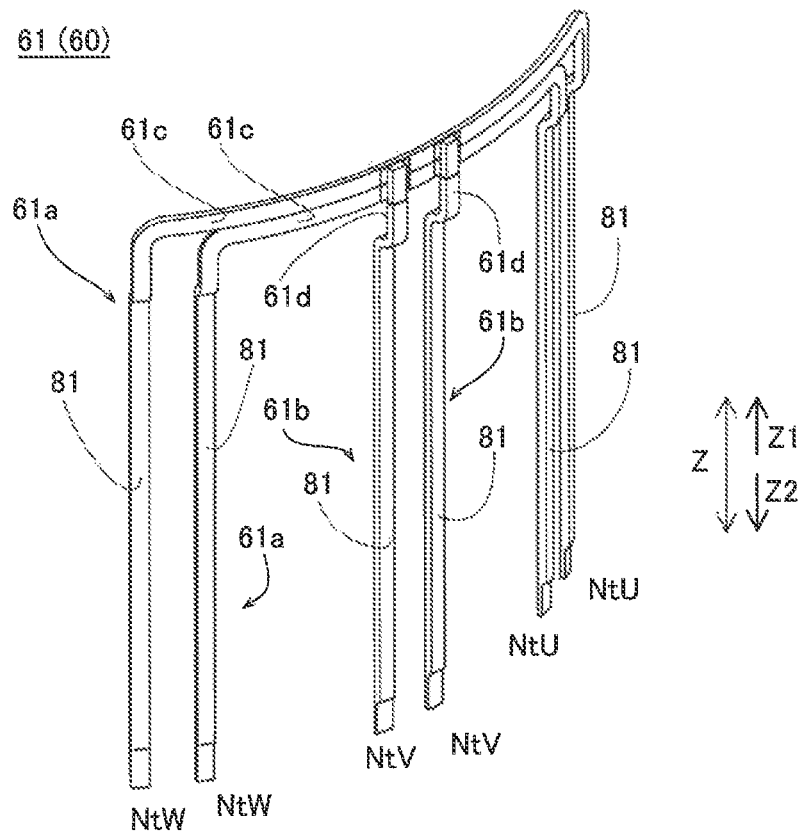
FIG. 10 is a figure showing a configuration of an outer radial side neutral point conductor according to the first embodiment.

As shown in FIG. 10, each outer radial side neutral point conductor 61 includes two U-phase W-phase neutral point segment conductors 61*a* and two V-phase neutral point segment conductors 61*b*. The U-phase W-phase neutral point segment conductors 61*a* include the U-phase second leg portions 81 connected to the first leg portions 71 of the first conductors 70 for the U-phase among the three-phase alternating current, the W-phase second leg portions 81 connected to the W-phase first leg portions 71, and two neutral point coil end portions 61*c* that each connect the U-phase second leg portion 81 and the W-phase second leg portion 81. The neutral point coil end portion 61*c* is formed to be continuous with the U-phase second leg portion 81 and is formed to be continuous with the W-phase second leg portion 81.

The U-phase W-phase neutral point segment conductor 61a is formed to have a substantially U-shape (substantially U-shape) when viewed from the inner radial side. The V-phase neutral point segment conductor 61b is formed in a substantially linear shape when viewed from the inner radial side.

As shown in FIG. 1, the neutral point coil end portion 61c is formed along the circumferential direction on the outer radial side of the second coil end portion 82 of the second conductor 80. The neutral point coil end portion 61c is formed in a substantially arc shape when viewed in the arrow Z2 direction. One of the two U-phase W-phase neutral point segment conductors 61a is disposed on the other outer axial side (arrow Z1 direction side).

As shown in FIG. 10, the V-phase neutral point segment conductor 61b includes a V-phase second leg portion 81 connected to the V-phase first conductor 70 and a neutral point coil end portion 61d. The neutral point coil end portion 61d is formed so as to protrude from the second leg portion 81 in the outer axial direction (in the arrow Z1 direction). The two neutral point coil end portions 61d are electrically joined to each other by being joined to both of the two neutral point coil end portions 61c.

Figure 11:
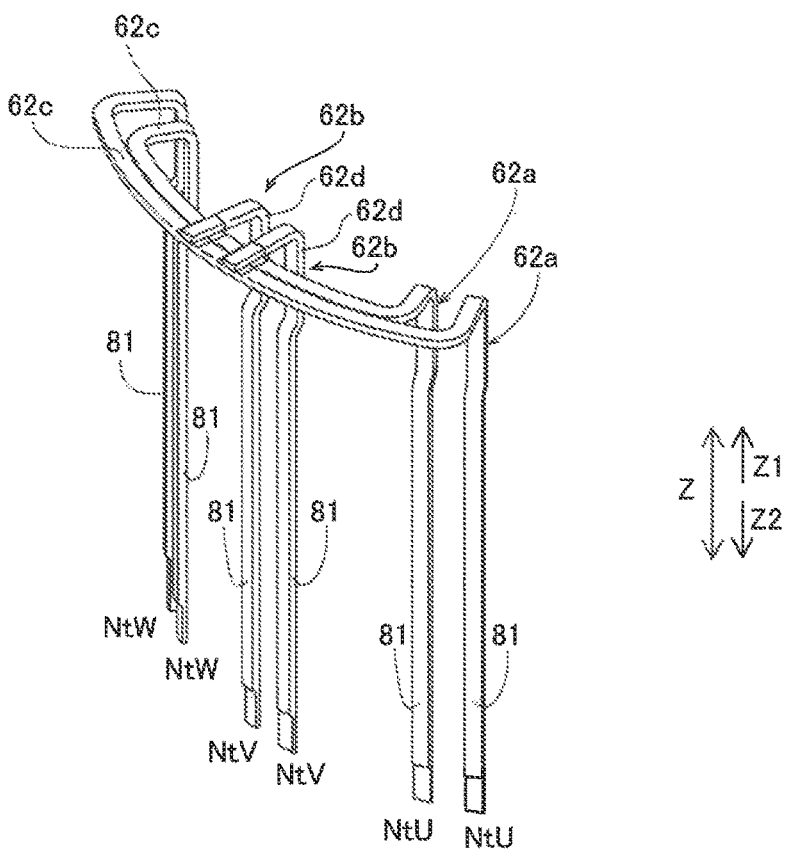
FIG. 11 is a figure showing a configuration of an inner radial side neutral point conductor according to the first embodiment.

As shown in FIG. 11, the inner radial side neutral point conductor 62 includes two U-phase W-phase neutral point segment conductors 62a and two V-phase neutral point segment conductors 62b. The U-phase W-phase neutral point segment conductors 62a include the U-phase second leg portions 81 connected to the first leg portions 71 of the first conductors 70 for the U-phase among the three-phase alternating current, the W-phase second leg portions 81 connected to the W-phase first conductor 70, and the neutral point coil end portions 62c that each connect the U-phase second leg portion 81 and the W-phase second leg portion 81. The neutral point coil end portions 62c are formed to be continuous with the U-phase second leg portions 81 and to be continuous with the W-phase second leg portion 81. As a result, the U-phase W-phase neutral point segment conductors 62a are formed in a substantially U-shape when viewed from the inner radial side. The V-phase neutral point segment conductors 62b are formed in a substantially linear shape when viewed from the inner radial side.

Figure 12:
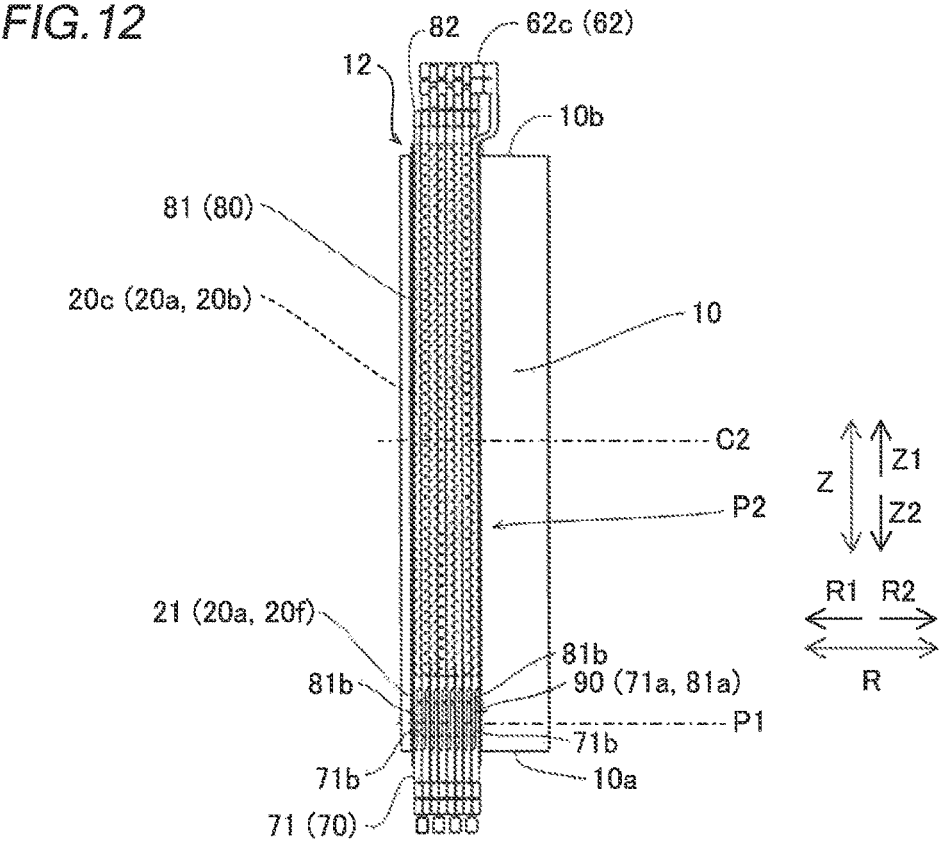
FIG. 12 is a sectional view taken along line 1000-1000 in FIG. 1.

As shown in FIG. 12, the neutral point coil end portion 62c is formed so as to protrude axially outward with respect to the second coil end portion 82 of the second conductor 80. The neutral-point coil end portion 62c is disposed close to the outer axial side of the second coil end portion 82 of the second conductor 80, and is formed along the circumferential direction when viewed in the axial direction. One of the two U-phase W-phase neutral point segment conductors 62a is disposed on outer radial side of the other U-phase W-phase neutral point segment conductor 62a.

The V-phase neutral point segment conductor 62b includes the V-phase second leg portion 81 connected to the first leg portion 71 of the V-phase first conductor 70, and a neutral point coil end portion 62d. The neutral point coil end portion 62d is formed so as to protrude from the second leg portion 81 to the outer axial side (arrow Z1 direction). The two neutral point coil end portions 62d are electrically joined by being joined to both of the two neutral point coil end portions 62c.

(Structure of Joint Portion)

Figure 13:
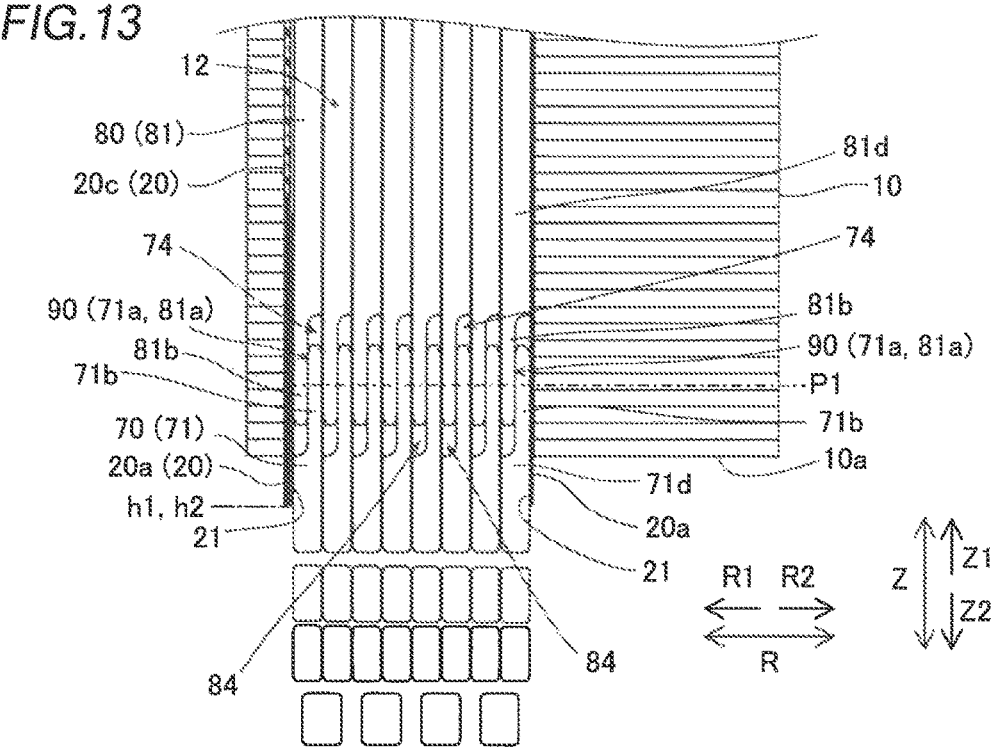
FIG. 13 is a partially enlarged view near a joint portion in FIG. 12.

As shown in FIGS. 12 and 13, the plurality of first leg portions 71 is provided in one slot 12 such that the first leg portions 71 are adjacent to each other in the radial direction of the stator core 10. In addition, the plurality of second leg portions 81 is provided in one slot 12 such that the second leg portions 81 are adjacent to each other in the radial direction of the stator core 10. The joint portion 90 is formed by joining a first surface 71a of the first leg portion 71 and a second surface 81a of the second leg portion 81, which are both described below.

Further, in one slot 12, the plurality of first conductors 70 (first leg portions 71) and the plurality of second conductors 80 (second leg portions 81) are joined. Specifically, in one slot 12, a plurality of first surface disposition portions 71b each provided with the first surface 71a, which is described below, of the first leg portion 71, and a plurality of second surface disposition portions 81b each provided with the second surface 81a, which is described below, of the second leg portion 81 are alternately arranged along the radial direction. That is, the joint portions 90, which are described below, of the first leg portions 71 and the second leg portions 81 are disposed adjacent to each other in the radial direction in one slot 12.

Specifically, the joint portions 90 are configured such that the joint portions 90 adjacent to each other in the radial direction overlap when viewed from the radial direction. Specifically, the plurality of (all) joint portions 90 disposed in one slot 12 are configured to overlap with each other when viewed in the radial direction. That is, all the joint portions 90 disposed in one slot 12 are disposed in a state in which the joint portions 90 are aligned along the horizontal direction. In other words, each position of the joint portions 90 in the axial direction in one slot 12 are substantially equal to each other. As will be described below, the joint portions 90 are parts in which the first surfaces 71a of the first leg portions 71 and the second surfaces 81a of the second leg portions 81 are joined (overlapped) when viewed from the radial direction.

Figure 14:
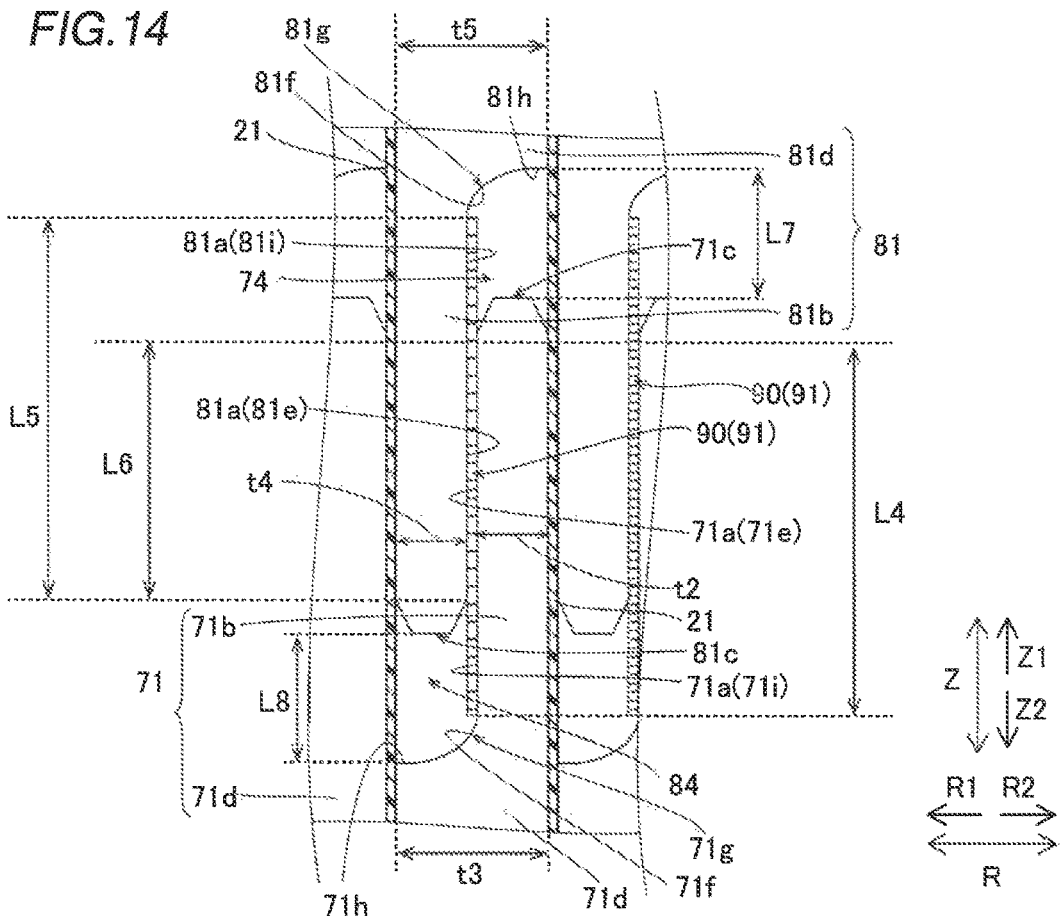
FIG. 14 is a partially enlarged view near the joint portion in FIG. 13.

Further, as shown in FIG. 14, each of the tip end portion 71c of the first leg portion 71 and tip end portion 81c of the second leg portion 81 has a tapered shape. Specifically, when viewed from the circumferential direction (A direction), each of the tip end portion 71c of the first leg portion 71 and the tip end portion 81c of the second leg portion 81 has a tapered shape.

The first surface 71a provided so as to extend in the axial direction is provided on the tip end portion 71c side of each of the first leg portions 71 of the plurality of first conductors 70. Further, the second surface 81a provided so as to extend in the axial direction is provided on the tip end portion 81c side of each of the second leg portions 81 of the plurality of second conductors 80. Specifically, each of the first surface 71a and the second surface 81a is provided so as to extend parallel to the axial direction. Further, the first leg portion 71 and the second leg portion 81 include the first surface disposition portion 71b provided with the first surface 71a and the second surface disposition portion 81b provided with the second surface 81a, respectively.

The first leg portion 71 has a first leg portion body portion 71d that is provided to be continuous with the first surface disposition portion 71b on which the first surface 71a is provided. The first leg portion body portion 71d is provided on the opposite side (Z2 direction side) of the first surface disposition portion 71b from the tip end portion 71c. Further, the second leg portion 81 has a second leg portion body portion 81d that is provided to be continuous with the second surface disposition portion 81b on which the second surface 81a is provided. The second leg portion body portion 81d is provided on the opposite side (Z1 direction side) of the second surface disposition portion 81b from the tip end portion 81c. Specifically, the first surface disposition portion 71b is provided to be continuous with the first leg portion body portion 71*d* via a first step portion 71*g* described below. Further, the second surface disposition portion 81*b* is provided to be continuous with the second leg portion body portion 81*d* via a second step portion 81*g* described below.

A thickness t2 of the first surface disposition portion 71*b*, which is provided with the first surface 71*a*, in the radial direction is smaller than a thickness t3 of the first leg portion body portion 71*d* in the radial direction. Specifically, the thickness t2 of the first surface disposition portion 71*b* is about half of the thickness t3 of the first leg portion body portion 71*d*. Further, a thickness t4 of the second surface disposition portion 81*b*, which is provided with the second surface 81*a*, in the radial direction is smaller than a thickness t5 of the second leg portion body portion 81*d* in the radial direction. Specifically, the thickness t4 of the second surface disposition portion 81*b* is about half of the thickness t5 of the second leg portion body portion 81*d*. The thickness t2 and the thickness t4 are substantially equal, and the thickness t3 and the thickness t5 are substantially equal.

Further, the coil portion 30 (see FIG. 2) includes the joint portion 90 in which the first surface 71*a* and the second surface 81*a* are joined in one slot 12. That is, the joint portion 90 is located between the end face 10*a* (see FIG. 2) and the end face 10*b* (see FIG. 2) of the stator core 10 in the axial direction.

Here, in the first embodiment, as shown in FIG. 14, the first surface 71*a* and the second surface 81*a* are joined to each other in the radial direction (R direction) at the joint portion 90. Specifically, a surface part 71*e* on the tip end portion 71*c* side of the first surface 71*a* and a surface part 81*e* on the tip end portion 81*c* side of the second surface 81*a* are joined in the radial direction. In other words, the first surface 71*a* and the second surface 81*a* are joined in a state of being displaced in the axial direction.

The first surface 71*a* (surface part 71*e*) and the second surface 81*a* (surface part 81*e*) are provided so as to extend parallel to the axial direction and to face each other in the radial direction. That is, each of the first surface 71*a* (surface part 71*e*) and the second surface 81*a* (surface part 81*e*) extends so as to be orthogonal to the radial direction. Further, the first surface 71*a* (surface part 71*e*) faces the inner radial side (R1 direction side), and the second surface 81*a* (surface part 81*e*) faces the outer radial side.

Further, in the first embodiment, a length L4 (see FIG. 14) of the first surface 71*a* in the axial direction and a length L5 (see FIG. 14) of the second surface 81*a* in the axial direction are larger than a length L6 (see FIG. 14) of the joint portion 90 in the axial direction. The length L4 of the first surface 71*a* and the length L5 of the second surface 81*a* are substantially equal lengths. The length L6 of the joint portion 90 means the length of the surface part 71*e* and the surface part 81*e* in the axial direction.

Further, in the first embodiment, between the first conductor 70 and the second conductor 80, which face each other in the axial direction, a first clearance portion 74 is provided between the tip end portion 71*c* of the first leg portion 71 and the second leg portion 81 in the axial direction. Further, between the first conductor 70 and the second conductor 80, which face each other in the axial direction, a second clearance portion 84 is provided between the tip end portion 81*c* of the second leg portion 81 and the first leg portion 71 in the axial direction. Specifically, the first clearance portion 74 is provided between the tip end portion 71*c* of the first leg portion 71 and the second leg portion body portion 81*d* of the second leg portion 81 in the axial direction. Further, the second clearance portion 84 is provided between the tip end portion 81*c* of the second leg portion 81 and the first leg portion body portion 71*d* of the first leg portion 71 in the axial direction.

When viewed from the circumferential direction (A direction), the first clearance portion 74 is surrounded by the first leg portion 71 and the second leg portion 81 that are joined to each other, and the second insulating member 21 adjacent on the inner radial side (R1 direction side). When viewed from the circumferential direction (A direction), the second clearance portion 84 is surrounded by the first leg portion 71 and the second leg portion 81 that are joined to each other, and the second insulating member 21 adjacent on the outer radial side (R2 direction side). The details of the configuration of the second insulating member 21 will be described below.

Further, each of the first clearance portion 74 and the second clearance portion 84 is provided for each set of the first leg portion 71 and the second leg portion 81 that are joined to each other. That is, a plurality of each of the first clearance portion 74 and the second clearance portion 84 is provided side by side in the radial direction (eight in the first embodiment, see FIG. 13). Specifically, when viewed from the radial direction, the plurality of first clearance portions 74 overlaps with each other, and the plurality of second clearance portions 84 overlaps with each other.

A length L7 of the first clearance portion 74 in the axial direction is substantially equal to a length L8 of the second clearance portion 84 in the axial direction. The length L7 of the first clearance portion 74 means the distance in the axial direction between the tip end portion 71*c* of the first leg portion 71 and the second leg portion 81. Further, the length L8 of the second clearance portion 84 means the distance in the axial direction between the tip end portion 81*c* of the second leg portion 81 and the first leg portion 71.

Further, in the first embodiment, both the axial length L7 of the first clearance portion 74 and the axial length L8 of the second clearance portion 84 are larger than the thickness t2 of the first surface disposition portion 71*b* provided with the first surface 71*a* of the first leg portion 71 and the thickness t4 of the second surface disposition portion 81*b* provided with the second surface 81*a* of the second leg portion 81, in the radial direction. The length L7 of the first clearance portion 74 and the length L8 of the second clearance portion 84 are each set to a length that can sufficiently absorb dimensional variations that occur in the manufacture of the first conductor 70 and the second conductor 80, and the assembly variation that occurs when the first conductor 70 and the second conductor 80 are assembled.

Further, between the first surface disposition portion 71*b* provided with the first surface 71*a* of the first leg portion 71 and the first leg portion body portion 71*d*, the first step portion 71*g* including a corner portion inner surface 71*f* that faces the second clearance portion 84 and that has a round shape is provided. Further, between the second surface disposition portion 81*b* provided with the second surface 81*a* of the second leg portion 81 and the second leg portion body portion 81*d*, the second step portion 81*g* including a corner portion inner surface 81*f* that faces the first clearance portion 74 and that has a round shape is provided. Specifically, the corner portion inner surface 71*f* and the corner portion inner surface 81*f* have an arc shape with a curvature radius smaller than the thickness t2 of the first surface disposition portion 71*b* in the radial direction and the thickness t4 of the second surface disposition portion 81*b* in the radial direction, respectively. In this case, the first leg portion 71 and the second leg portion 81 are provided with a flat surface 71*h* and a flat surface 81*h* that are provided to be continuous with the corner portion inner surface 71*f* and the corner portion inner surface 81f, respectively. Each of the flat surface 71h and the flat surface 81h is provided so as to extend orthogonal to the axial direction.

Further, as shown in FIG. 13, each of the first clearance portion 74 and the second clearance portion 84 is disposed in the slot 12. Specifically, the entirety of each of the first clearance portion 74 and the second clearance portion 84 is disposed in the slot 12.

Further, since the length L1 of the pair of first leg portions 71 (see FIG. 7) and the length L2 of the pair of second leg portions 81 (see FIG. 8) are different from each other, by joining the first surface 71a of the first leg portion 71 and the second surface 81a of the second leg portion 81, each of the first clearance portion 74 and the second clearance portion 84 (joint portion 90) is provided on the end face 10a side of the axial center C2 in the axial direction (see FIG. 12). As a result, each of the first clearance portion 74 and the second clearance portion 84 is provided closer to the end face 10a of the stator core 10 than the axial center C2 of the stator core 10. Specifically, the edge portion of the second clearance portion 84 on one side (Z2 direction side) in the axial direction is provided at a position substantially the same as the end face 10a of the stator core 10 in the axial direction. Further, the edge portion of the second clearance portion 84 on one side (Z2 direction side) in the axial direction may be provided within a range of substantially insulating creepage distance from the end face 10a in the Z1 direction or the Z2 direction. The axial center C2 is an example of a "center" of the claims.

Further, the stator 100 includes a conductive adhesive 91 that adheres the first surface 71a and the second surface 81a at the joint portion 90 and that makes the first leg portion 71 and the second leg portion 81 conductive. The conductive adhesive 91 is a paste joining material (silver nanopaste) that contains, as conductive particles, metal particles obtained by miniaturizing silver to a nanometer level, in a solvent. Further, the conductive adhesive 91 is configured to be melted by heat.

Further, the conductive adhesive 91 contains a member (resin member) that volatilizes when heated, and has a function of bringing the first surface 71a and the second surface 81a close to each other when the volatilizing member is heated and the volume of the conductive adhesive 91 is decreased. Further, in order to join the first surface 71a and the second surface 81a, the first conductor 70 and the second conductor 80 are assembled in a state in which the conductive adhesive 91 is applied in advance to a part corresponding to at least one of the joint portion 90 of the first surface 71a and the second surface 81a (at least one of the surface part 71e and the surface part 81e). In FIG. 14, the thickness of the conductive adhesive 91 is emphasized for the sake of explanation, and the present disclosure is not limited to this example indicated in the drawing.

Here, in the first embodiment, the conductive adhesive 91 is applied to a surface part 71i, which faces the second surface 81a when viewed from the radial direction, of the first surface 71a, and a surface part 81i, which faces the first clearance portion 74 when viewed from the radial direction, of the second surface 81a, in addition to at least one of the surface part 71e and the surface part 81e, and the second clearance portion 84 of the first surface 71a when viewed from the radial direction. Specifically, the conductive adhesive 91 is applied to the entirety of each of the surface part 71i and the surface part 81i. That is, each of the first surface 71a and the second surface 81a is entirely covered with the conductive adhesive 91 when viewed from the radial direction. The conductive adhesive 91 is not applied to each of the corner portion inner surface 71f and the corner portion inner surface 81f. The surface part 71i and the surface part 81i are examples of a "part facing the second clearance portion" and a "part facing the first clearance portion" in the claims, respectively.

(Configuration of First Insulating Member)

Figure 15:
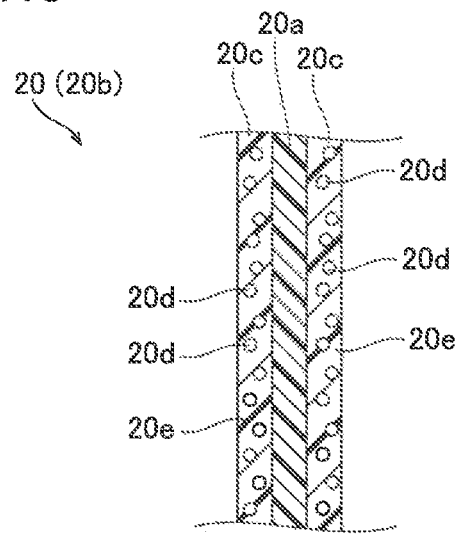
FIG. 15 is a sectional view schematically showing a configuration of the first insulating member according to the first embodiment.
Figure 16:
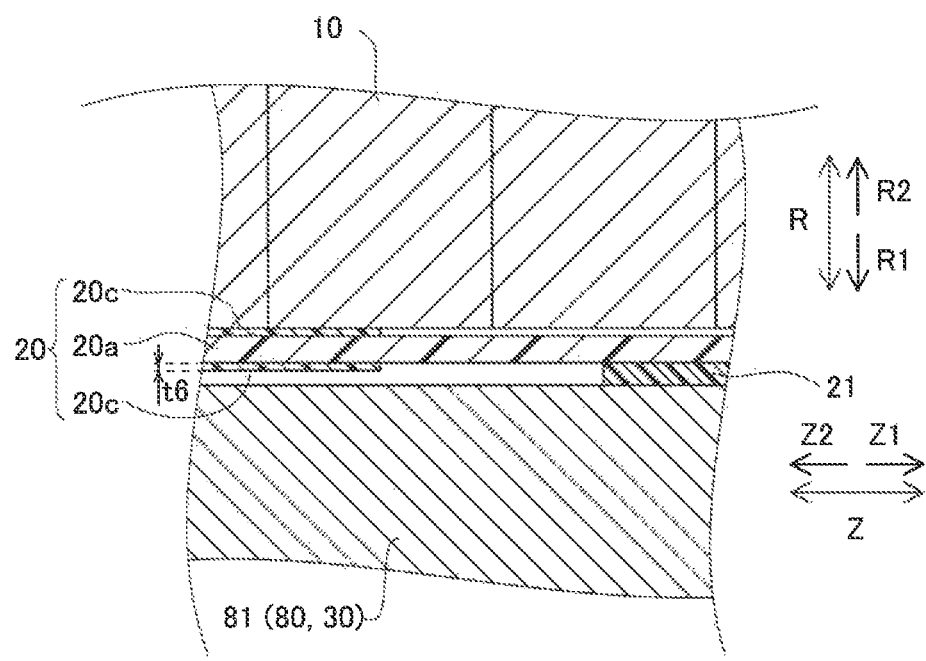
FIG. 16 is a sectional view showing the configuration of the first insulating member and the second insulating member including a fixing layer before foaming according to the first embodiment.
Figure 17:
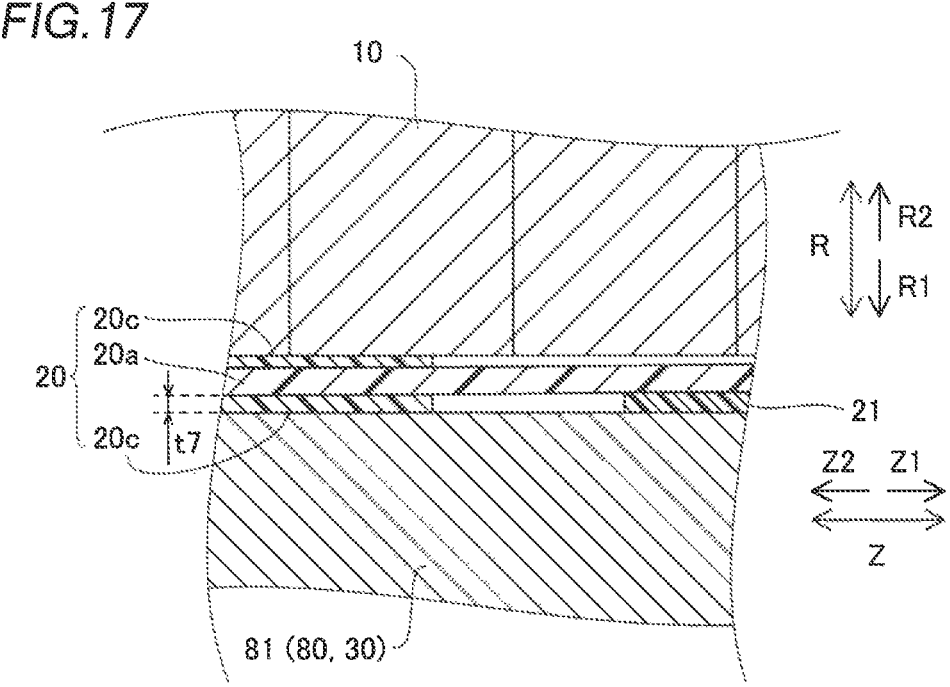
FIG. 17 is a sectional view showing the configuration of the first insulating member and the second insulating member including a fixing layer after foaming according to the first embodiment.

As shown in FIG. 4, the first insulating member 20 is disposed between the wall portion 11a and the teeth 13 and the first leg portion 71 and the second leg portion 81 (segment conductor 40). As shown in FIG. 15, the first insulating member 20 has a three-layer configuration. Specifically, as shown in FIG. 12, the first insulating member 20 includes, in the slot 12: an insulating layer 20a that is provided between the wall portion 11a of the back yoke 11 and the circumferential side surface 13a of the teeth 13 (see FIG. 4), and the first leg portion 71 and the second leg portion 81, and that insulates the wall portion 11a and the circumferential side surface 13a from the first leg portion 71 and the second leg portion 81; and a fixing layer 20c that is provided so as to overlap with a part 20b at a position (region) (P2) different from the position P1 in the axial direction corresponding to the joint portion 90 among the insulating layer 20a and that fixes the stator core 10 and the second leg portion 81. The fixing layer 20c is preferably configured as an adhesive layer containing an adhesive. In addition, the position P2 includes, in the axial direction, the entire region inside the slot 12 of the part excluding the axial position P1, and a part near the end face 10b of the stator core 10 (including the part outside the slot 12 in the axial direction) for example.

And the first insulating member 20 is disposed so as to integrally cover the surroundings of the second leg portions 81 disposed in parallel in the radial direction when viewed in the arrow Z2 direction. In other words, both sides in the circumferential direction and both sides in the radial direction of the second leg portions 81 disposed in parallel in the radial direction are covered by the first insulating member 20. In this way, the first insulating member 20 can ensure the insulation between the joint portion 90 and the stator core 10.

The insulating layer 20a is configured of a polyphenylene sulfide resin (PPS), for example. The insulating layer 20a may be formed in a non-woven fabric form such as aramid paper. In addition, as shown in FIG. 12, the insulating layer 20a is provided across from the end face 10a on one axial side of the stator core 10 to the end face 10b on the other axial side. That is, the insulating layer 20a is disposed so as to cover the wall portion 11a and the circumferential side surface 13a in each slot. In addition, to "cover" does not only mean to cover all parts of the wall portion 11a and the circumferential side surface 13a, but means a broad concept including a case in which the inner radial side part (distal end gap part) of the circumferential side surface 13a is exposed, as shown in FIG. 4.

As shown in FIG. 15, the fixing layer 20c includes a foaming agent 20d (expanding agent) that foams due to heat. Specifically, the fixing layer 20c is formed, for example, by mixing a plurality of capsule bodies serving as the foaming agent 20d with a thermosetting resin 20e. The foaming agent 20d is configured to expand the volume of the capsule body when heated to a foaming temperature T1 or higher. The thickness of the fixing layer 20c increases from the thickness t6 (see FIG. 16) to the thickness t7 (see FIG. 17) by being heated in the manufacturing process of the stator 100, for example. As a result, the fixing layer 20c fills the space between the second leg portion 81 and the wall portion 11a and the circumferential side surface 13a by the foaming agent 20d foaming (expanding) when heated.

Further, the thermosetting resin 20e is configured to be cured by being heated to a curing temperature T2 or higher which is higher than the foaming temperature T1. The thermosetting resin 20e forming the fixing layer 20c is, for example, an epoxy resin. The fixing layer 20c is configured such that when the fixing layer 20c is heated, the thermosetting resin 20e is cured such that the second leg portion 81 and the wall portion 11a and the circumferential side surface 13a are bonded and fixed.

As shown in FIG. 12, the fixing layer 20c containing the foaming agent 20d in the foamed state fills a space between at least a part of the second leg portion 81, and the wall portion 11a and the circumferential side surface 13a that configure the slot 12, at the position P2 different from the position P1 in the axial direction corresponding to the joint portion 90. Specifically, the fixing layer 20c is provided so as to overlap with the part 20b of the insulating layer 20a on the other axial side (Z1 direction side) of the position P1 in the axial direction corresponding to the joint portion 90. In other words, the fixing layer 20c is provided so as to overlap with the part 20b of the insulating layer 20a on the other axial side of the vicinity of the end face 10a on the one axial side (Z2 direction side). Further, the fixing layer 20c is provided in the slot 12 so as to overlap with the part 20b of the insulating layer 20a that is disposed between the second leg portion 81 and the stator core 10. For example, as shown in FIG. 15, the fixing layer 20c is provided so as to overlap with and sandwich the insulating layer 20a in the part 20b of the insulating layer 20a at a position different from the axial position corresponding to the joint portion 90.

Figure 18:
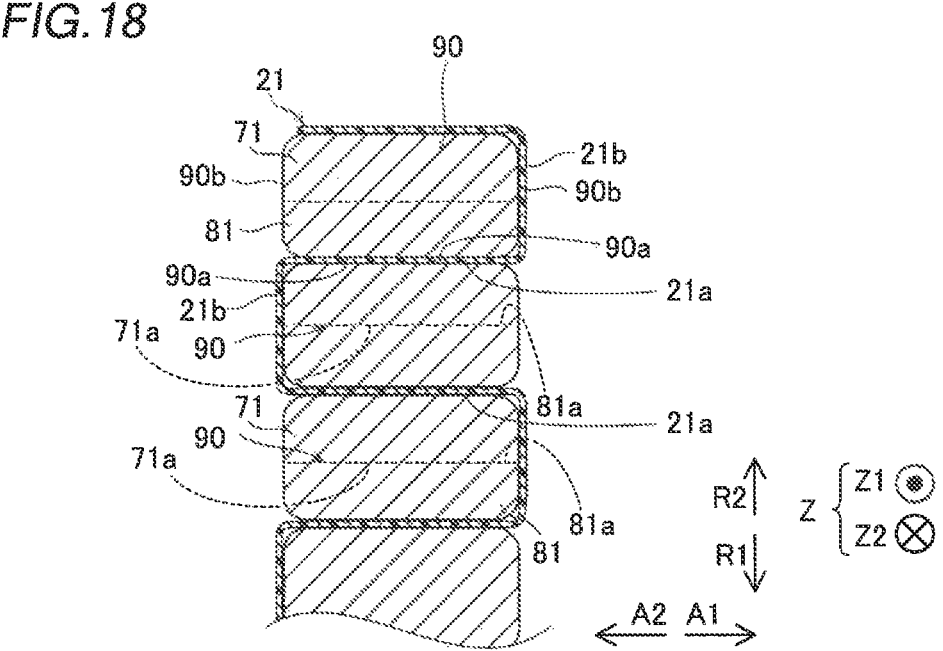
FIG. 18 is a sectional view showing the configuration of the second insulating member according to the first embodiment.

Further, in the first embodiment, as shown in FIG. 13, the first insulating member 20 provided between the slot 12 and the coil portion 30 and the second insulating member 21 provided separately from the first insulating member 20 are provided. As shown in FIG. 18, the joint portions 90 adjacent in the radial direction, among the joint portions 90 each in which the first surface 71a of the first leg portion 71 of the first conductor 70 and the second surface 81a of the second leg portion 81 of the second conductor 80 are joined between the coils adjacent in the radial direction in one slot 12, are insulated by the second insulating member 21 that has a sheet shape and that is provided separately from the first insulating member 20. The term "coils" means a linear part of the coil portion 30 that is disposed in the slot 12 after the first conductor 70 and the second conductor 80 are joined. Thus, a plurality of coils is disposed in one slot 12. The second insulating member 21 is an example of a "joint portion insulating member" in the claims.

Here, in the first embodiment, as shown in FIG. 18, the second insulating member 21 is formed by folding one sheet-shaped insulating member such as a Nomex. The second insulating member 21 includes: a facing surface insulating part 21a that covers facing surfaces 90a of the joint portions 90 that are adjacent in the radial direction; and a circumferential surface insulating part 21b that is continuous from both end portions of the facing surface insulating part 21a in the circumferential direction and that covers one of the circumferential surfaces 90b of the joint portion 90 that are adjacent in the radial direction for at least the insulation distance. The facing surface 90a of the joint portion 90 means an outer radial surface and an inner radial surface, which face each other, of the joint portions 90 that are radially adjacent to each other. The insulation distance means a distance (creepage distance) that is a length along the circumferential surface insulating part 21b in the radial direction and that is sufficient for insulating the joint portions 90, which are adjacent to each other, from each other.

Figure 19:
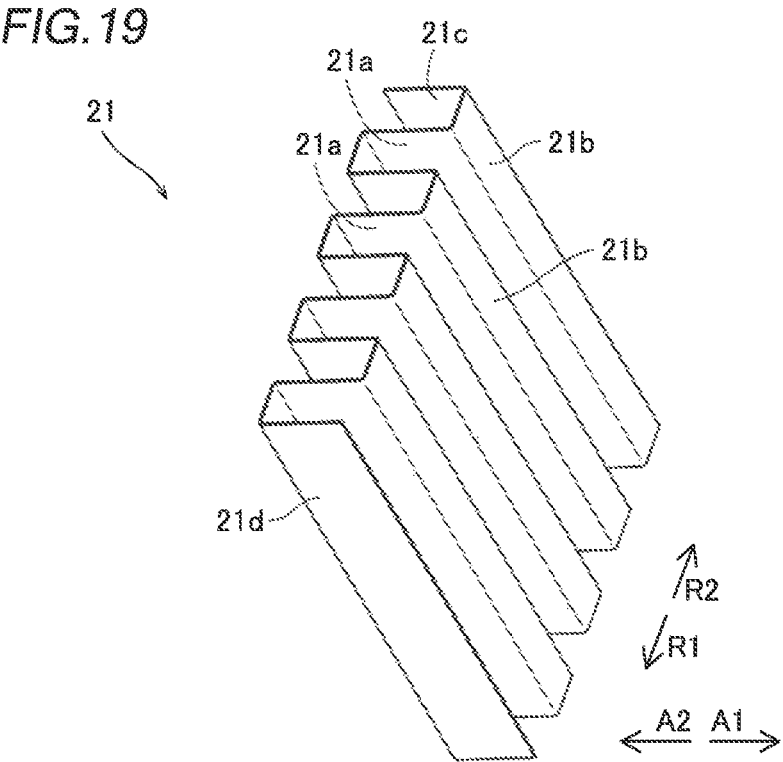
FIG. 19 is a perspective view showing the configuration of the second insulating member according to the first embodiment.

As shown in FIG. 19, the second insulating member 21 includes a part 21c that covers an outer radial side of the joint portion 90 disposed on the outermost radial side, and a part 21d that covers the inner radial side of the joint portion 90 disposed on the innermost radial side.

Further, in the second insulating member 21, the facing surface insulating parts 21a that are adjacent in the radial direction are connected to each other by the circumferential surface insulating part 21b in one or the other circumferential direction. Specifically, the facing surface insulating part 21a on the outer radial side among the pair of facing surface insulating parts 21a disposed adjacent to each other in the radial direction, the circumferential surface insulating part 21b provided on one side in the circumferential direction, the facing surface insulating part 21a on the inner radial side among the pair of facing surface insulating parts 21a, and the circumferential surface insulating part 21b provided on the other side in the circumferential direction are formed to be continuous. That is, the circumferential surface 90b on the A1 direction side of the joint portion 90 and the circumferential surface 90b on the A2 direction side of the joint portion 90 are alternately covered by the circumferential surface insulating part 21b. In other words, the second insulating member 21 is configured so as not to continuously cover the circumferential surfaces 90b of the plurality of joint portions 90 disposed adjacent to each other in the radial direction.

Thus, the second insulating member 21 has a meandering shape (bellows shape) when viewed from the axial direction. Further, since one second insulating member 21 insulates the joint portions 90 that are adjacent to each other in the radial direction and that are disposed in one slot 12, all the joint portions 90 in the slot 12 are insulated from each other. This makes it possible to reduce the number of steps for disposing the second insulating member 21 as compared to the case in which the plurality of joint portions 90 disposed in one slot 12 is individually covered by the insulating member.

Further, as shown in FIG. 19, the second insulating member 21 is configured to be expandable/contractible along the radial direction. The second insulating member 21 is made of a flexible sheet-shaped insulating member, and is configured to not continuously cover the circumferential surfaces 90b of the plurality of joint portions 90 disposed adjacent to each other in the radial direction. Thus, even when the first leg portion 71 and the second leg portion 81 are pressed in the radial direction or the axial direction when the first leg portion 71 and the second leg portion 81 are joined, the second insulating member 21 can be deformed with the movement of the first leg portion 71 and the second leg portion 81.

Here, in the first embodiment, as shown in FIG. 13, the second insulating member 21 is provided to extend in the axial direction so as to cover both the first clearance portion 74 and the second clearance portion 84 when viewed from the radial direction. Specifically, the second insulating member 21 is disposed so that an edge portion on one axial side (Z2 direction side) protrudes outward (toward the Z2 direction side) from the end face 10a of the stator core 10 in the central axis direction. Further, in the second insulating member 21, the edge portion on the other axial side (Z1 direction side) is provided on the other axial side (Z1 direction side) of the edge portion on the other axial side (Z1 direction side) of the first clearance portion 74 in the slot 12.

Further, as shown in FIG. 13, the first insulating member 20 is also disposed together with the second insulating member 21 so as to protrude outward (toward the Z2 direction side) from the end face 10a of the stator core 10 in the axial direction. A height position h1 of the part of the second insulating member 21 protruding outward from the end face 10a of the stator core 10 and a height position h2 of the part of the first insulating member 20 protruding outward from the end face 10a of the stator core 10 are substantially equal. The protrusion amount of the first insulating member 20 and the second insulating member 21 from the end face 10a of the stator core 10 is adjusted to a degree in which the first insulating member 20 and the second insulating member 21 are not bent by coming into contact with the first coil end portion 72 of the first segment conductor 70.

Figure 20:
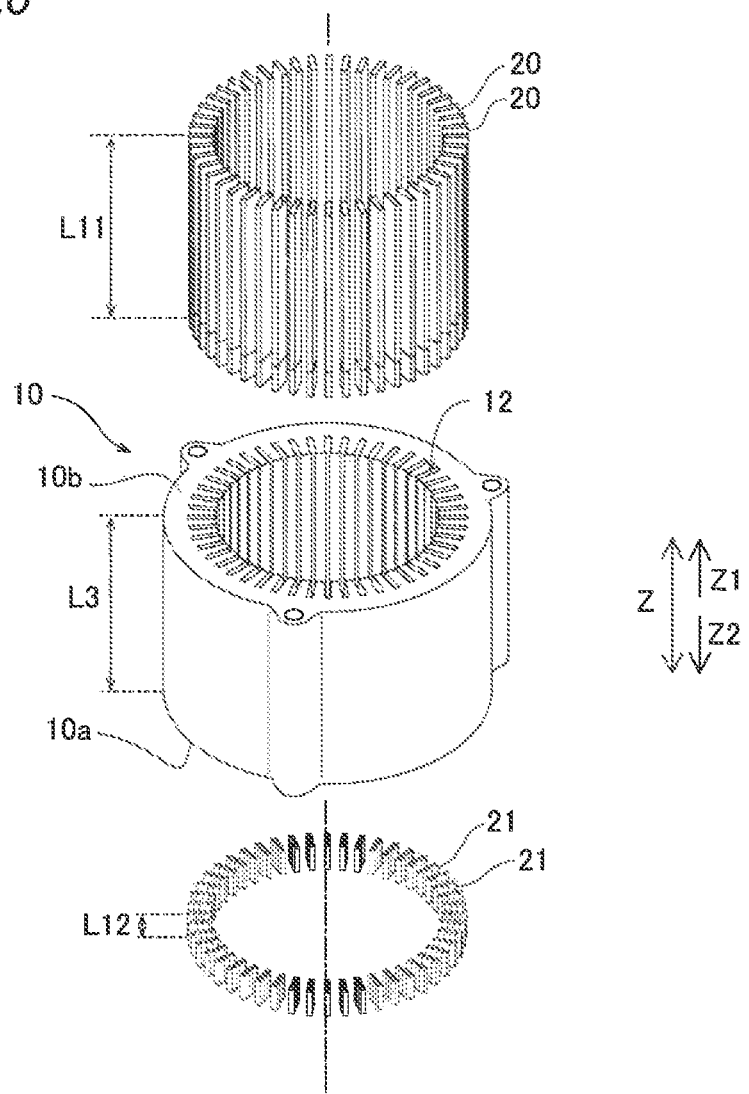
FIG. 20 is an exploded perspective view in which the stator core, the first insulating member, and the second insulating member according to the first embodiment are disassembled.

Further, as shown in FIG. 20, a length L12 of the second insulating member 21 is smaller than a length L11 of the first insulating member 20 in the axial direction. Specifically, the length L11 of the first insulating member 20 is larger than the length L3 of the stator core 10 in the axial direction. The length L12 of the second insulating member 21 is smaller than the length L3 of the stator core 10. The second insulating member 21 is provided so as to cover the joint portion 90 and extend from the joint portion 90 toward the Z1 direction side and the Z2 direction side. The length L12 of the second insulating member 21 is adjusted based on the magnitude of the voltage applied to the coil portion 30 (based on the required creepage distance). In FIG. 20, illustration of the first conductor 70 and the second conductor 80 is omitted for simplification.

Figure 21:
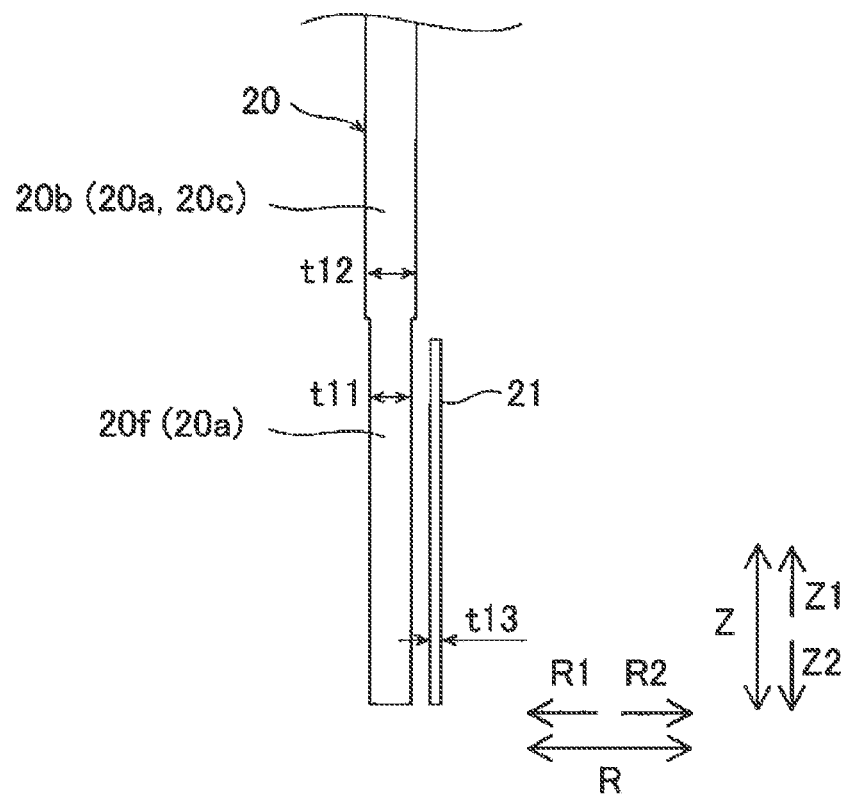
FIG. 21 is a figure showing the thickness of the first insulating member and the thickness of the second insulating member according to the first embodiment.

Further, since the length L12 of the second insulating member 21 is smaller than the length L11 of the first insulating member 20, as shown in FIG. 21, the first insulating member 20 has a part 20f that overlaps with the second insulating member 21 and the part 20b that does not overlap with the second insulating member 21 when viewed in the radial direction. Specifically, the first insulating member 20 overlaps with the second insulating member 21 in the vicinity of the end portion (end face 10a) in the axial direction in the slot 12. A thickness t11 of the part 20f of the first insulating member 20 that overlaps with the second insulating member 21 is smaller than a thickness t12 of the part 20b of the first insulating member 20 that does not overlap with the second insulating member 21.

A thickness t13 of the second insulating member 21 is smaller than the thickness t11. Further, the thickness t12 is obtained by adding the thickness t11 to the thickness t7 of two sheets (t7×2) of the fixing layer 20c.

Further, the second insulating member 21 is disposed on one axial side (Z2 direction side) with respect to the fixing layer 20c of the first insulating member 20 and between the joint portions 90 in the radial direction, and is configured to insulate the joint portions 90 from each other. Specifically, the fixing layer 20c is provided so as to overlap with the part 20b of the insulating layer 20a that does not overlap with the second insulating member 21 in the radial direction. Further, the insulating layer 20a is disposed in the part 20f that overlaps with the second insulating member 21 when viewed in the radial direction.

(Conductor Insertion Step)

Next, a step of inserting each segment conductor into the slot 12 will be described with reference to FIG. 22.

Figure 22:
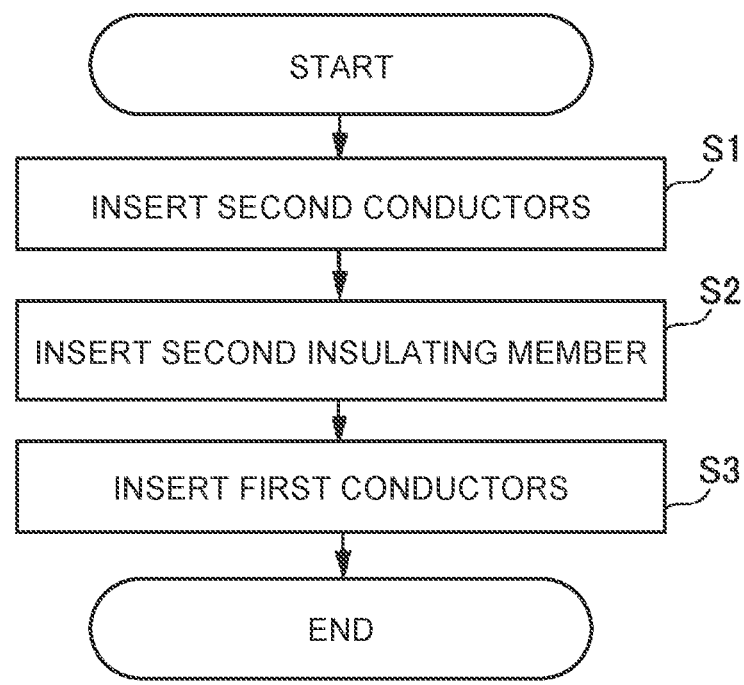
FIG. 22 is a flow diagram for demonstrating a step of inserting a conductor into a slot according to the first embodiment.

As shown in FIG. 22, in step S1, the plurality of second conductors 80 is inserted in the slot 12 from the Z1 direction side. At this time, each of the second conductors 80 is inserted in the slot 12 by each second coil end portion 82 being simultaneously pressed from the upper side (Z1 direction side) by a plate-shaped member having a disc shape. As a result, the protrusion amount of each of the second coil end portions 82 of the plurality of second conductors 80 from the stator core 10 is made uniform.

Next, in step S2, the second insulating member 21 is inserted in the slot 12. Specifically, the second insulating member 21 is disposed on the tip end portion side of the plurality of second conductors 80 inserted in the slot 12.

Then, in step S3, the plurality of first conductors 70 is inserted in the slot 12 from the Z2 direction side. At this time, the plurality of first conductors 70 is inserted in the slot 12 by the first coil end portions 72 being simultaneously pressed from the lower side (Z2 direction side) by a plate-shaped member having a disc shape. As a result, the protrusion amount of the plurality of first coil end portions 72 from the stator core 10 is made uniform.

Second Embodiment

Next, a stator 200 and the manufacturing method of the stator 200 according to the second embodiment will be described with reference to FIG. 1, FIG. 3, and FIGS. 23 to 31. Unlike the first embodiment described above, in the stator 200 according to the second embodiment, a first surface 171a and a second surface 181a are joined by the urging force of a spring member 210. The same configurations as those in the first embodiment described above are indicated by the same reference numerals as those in the first embodiment and are shown in the drawings, and the description thereof will be omitted.

[Structure of Stator]

The structure of the stator 200 according to the second embodiment will be described with reference to FIG. 1, FIG. 3, and FIGS. 23 to 30. The stator 200 is an example of the "armature" in the claims.

Figure 23:
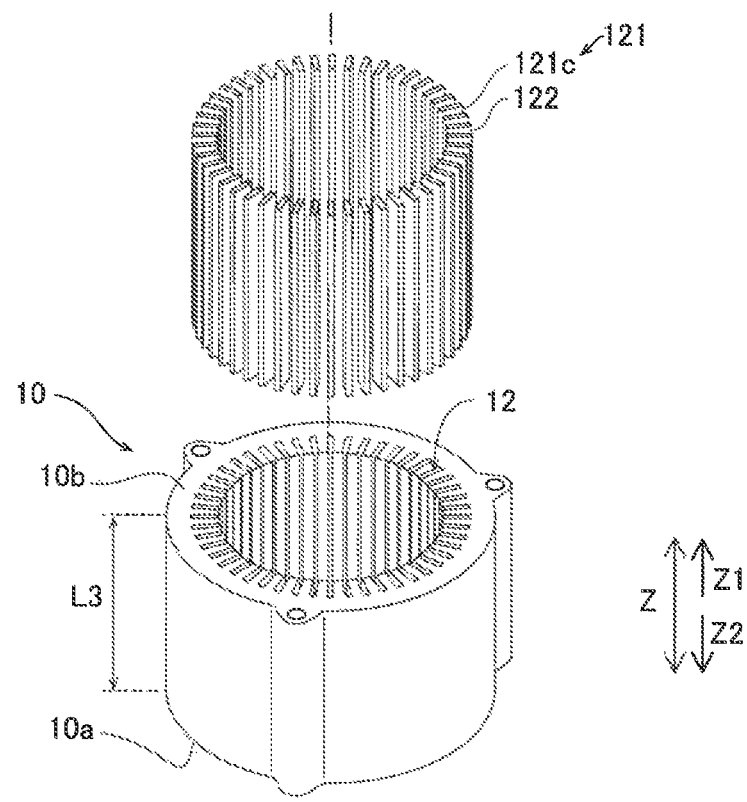
FIG. 23 is an exploded perspective view of the stator according to the second embodiment.

As shown in FIG. 1, the stator 200 and the rotor 101 form a part of the rotary electric machine 202. Further, as shown in FIG. 23, the stator 200 includes a sheet-shaped insulating member 121 and a coil portion 130 (see FIG. 1). The coil portion 130 includes a first coil assembly 130a (non-lead side coil) (see FIG. 27) and a second coil assembly 130b (lead side coil) (see FIG. 27). The coil portion 130 is composed of a plurality of segment conductors 140 (see FIG. 24). The insulating member 121 is an example of a "joint portion insulating member" in the claims.

(Configuration of Segment Conductor)

Figure 24:
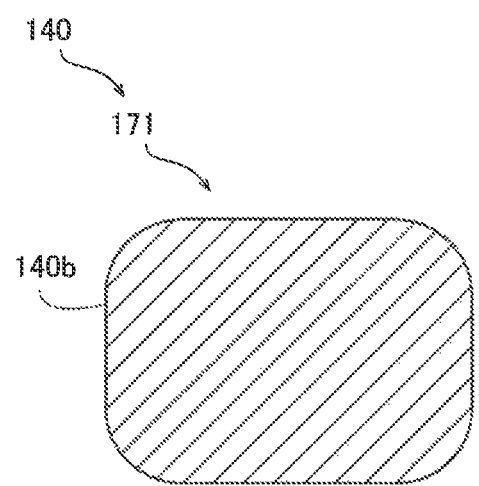
FIG. 24 is a cross-sectional view showing a configuration of a leg portion of a segment conductor according to the second embodiment.
Figure 25A:
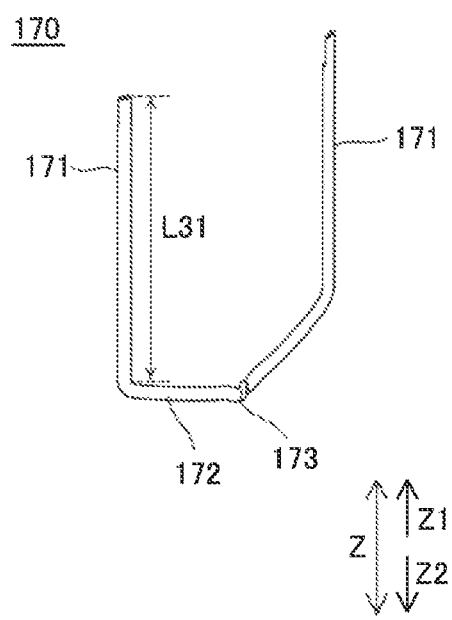
(FIG. 25A is a perspective view of the first segment conductor viewed from the outer radial side.
Figure 25B:
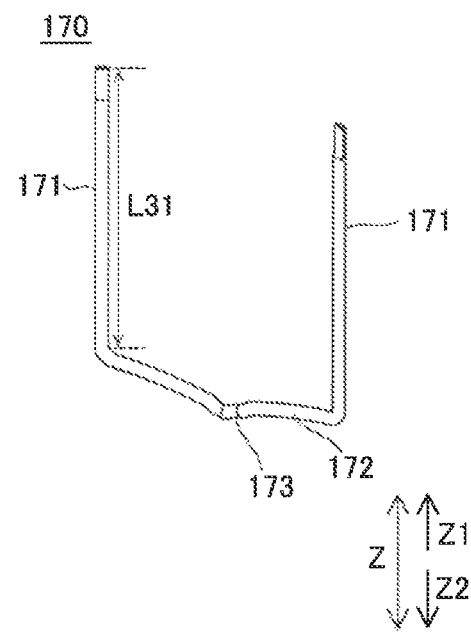
FIG. 25B is a perspective view of the first segment conductor viewed from the inner radial side.)
Figure 26A:
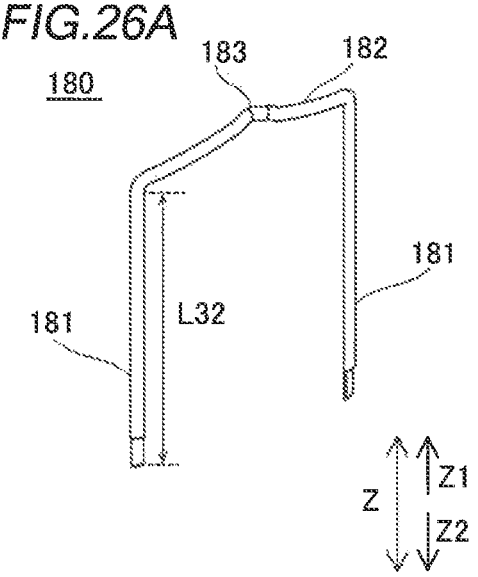
(FIG. 26A is a perspective view of the second segment conductor viewed from the outer radial side.
Figure 26B:
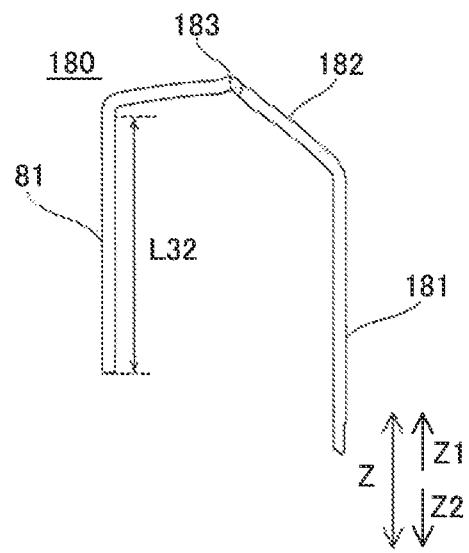
FIG. 26B is a perspective view of the second segment conductor viewed from the inner radial side.)

As shown in FIG. 24, in the segment conductor 140, a first leg portion 171 (second leg portion 181), described below, is not covered with the insulating coating and a conductor surface 140b is exposed (see FIG. 24). In FIG. 24, only the first conductor 170 described below is shown. However, since a second conductor 180 is similar, illustration thereof is omitted.

<Structure of First Conductor and Second Conductor>

As shown in FIGS. 25A, 25B, 26A, and 26B, the plurality of segment conductors 140 includes a plurality of the first conductors 170 disposed on one axial side (Z2 direction side) of the stator core 10 and a plurality of the second conductors 180 disposed on the other axial side (Z1 direction side) of the stator core 10. Further, the first conductor 170 includes the first leg portion 171 having a length L31 in the axial direction, a first coil end portion 172, and a first crank portion 173. The second conductor 180 includes the second leg portion 181 having a length L32 in the axial direction, a second coil end portion 182, and a second crank portion 183. The length L31 of the first leg portion 171 and the length L32 of the second leg portion 181 are substantially the same.

Figure 27:
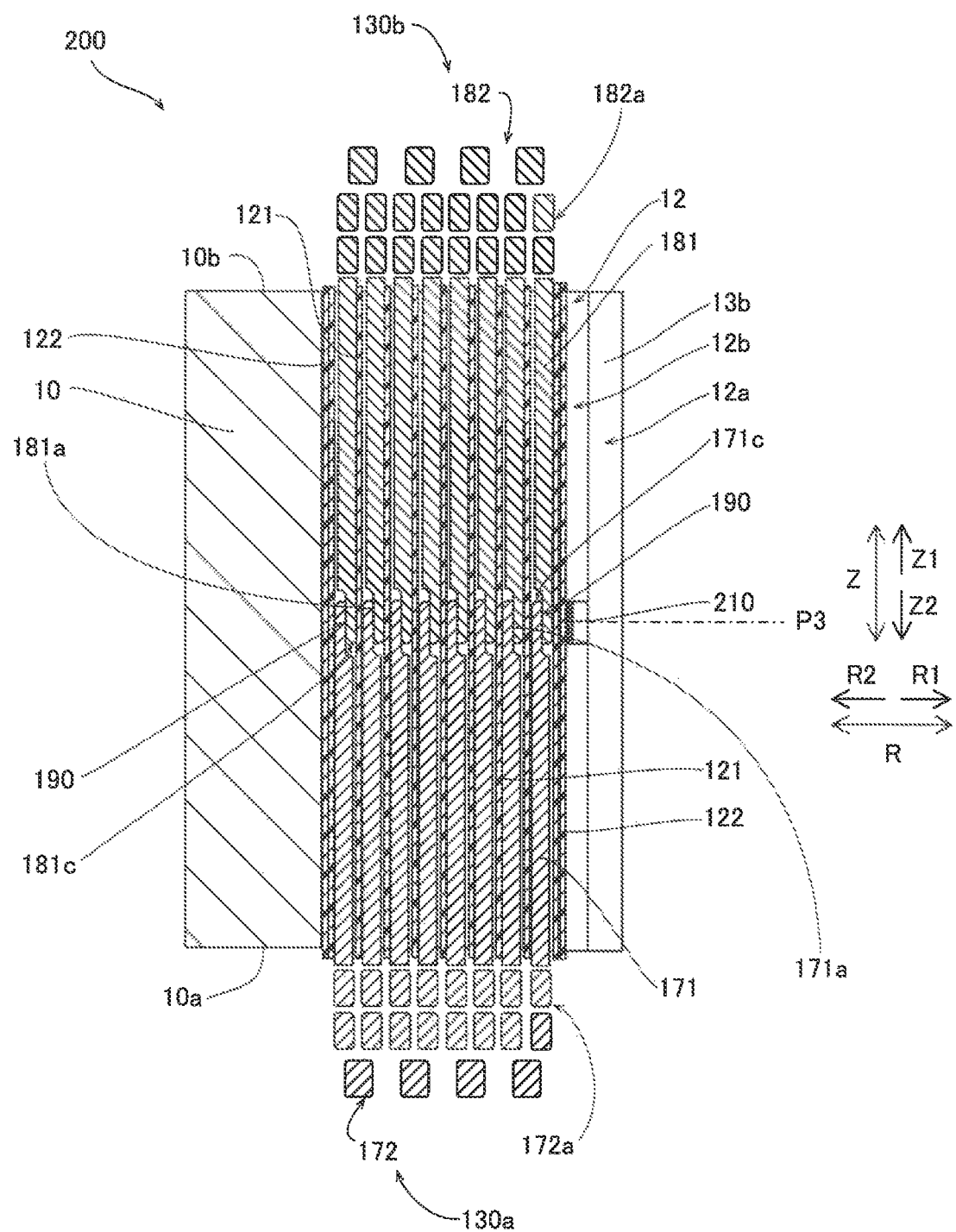
FIG. 27 is a sectional view of a coil portion and a stator core according to the second embodiment.

Further, as shown in FIG. 27, the stator 200 includes the spring member 210 that is provided in each of the plurality of slots 12 so as to be sandwiched between the coil portion 130 and the opening portion 12a (protruding portion 13b) of the slot 12. That is, the spring member 210 is provided in a distal end clearance 12b provided on the radially inner side, inside the slot 12.

The spring member 210 is configured to press the coil portion 130 from the inner radial side of the coil portion 130 in the radial direction such that the first surface 171a of the first leg portion 171 of the first conductor 170 and the second surface 181a of the second leg portion 181 of the second conductor 180 are in contact with each other. A contact portion 190 is formed by contact between the first surface 171a of the first leg portion 171 and the second surface 181a of the second leg portion 181. The contact portion 190 is an example of a "joint portion" in the claims.

The first surface 171a and the second surface 181a are in contact with each other by being pressed by the spring member 210 without a binder being interposed between the first surface 171a and the second surface 181a. That is, the first surface 171a and the second surface 181a are not joined, and the contact state between the first surface 171a and the second surface 181a is maintained by the pressing force of the spring member 210.

Further, each of the plurality of contact portions 190 is disposed in the central portion of the stator core 10 in the axial direction, in the slot 12. The spring member 210 is also disposed in the central portion of the stator core 10 in the axial direction. Specifically, the spring member 210 is provided so as to overlap with each of the plurality of contact portions 190 when viewed in the radial direction.

Further, each of the first surface 171a and the second surface 181a is plated. That is, the plated surfaces (the first surface 171a and the second surface 181a) are in contact with each other.

In the plating process, metals such as nickel (Ni), silver (Ag), gold (Au), and tin (Sn) are used. The plating process may be performed using a plurality of metals (for example, Ni and Ag) among the above metals.

Figure 28:
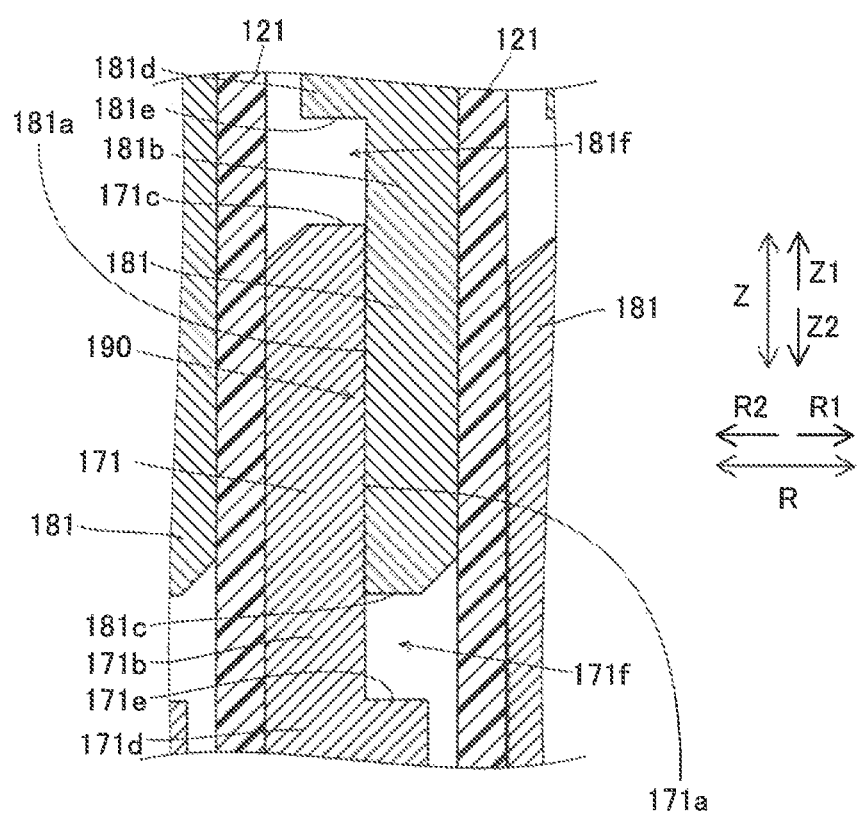
FIG. 28 is a partially enlarged view near a contact portion in FIG. 27.

As shown in FIG. 28, the first leg portion 171 includes a first surface disposition portion 171b, a tip end portion 171c, a first leg portion body portion 171d, and a first step portion 171e. A clearance portion 171f is provided between the first step portion 171e and the tip end portion 181c of the second leg portion 181. The clearance portion 171f is an example of a "first clearance portion" in the claims.

Further, the second leg portion 181 includes a second surface disposition portion 181b, a tip end portion 181c, a second leg portion body portion 181d, and a second step portion 181e. A clearance portion 181f is provided between the second step portion 181e and the tip end portion 171c of the first leg portion 171. The clearance portion 181f is an example of a "second clearance portion" in the claims.

Further, the first surface disposition portion 171b and second surface disposition portion 181b are provided at a central portion P3 (see FIG. 27) in the axial direction of the stator core 10. In FIG. 28, each of the first step portion 171e and the second step portion 181e is shown so as not to have a corner portion inner surface having a round shape. However, similar to the first embodiment described above, each of the first step portion 171e and the second step portion 181e may have a corner portion inner surface having a round shape.

Figure 29:
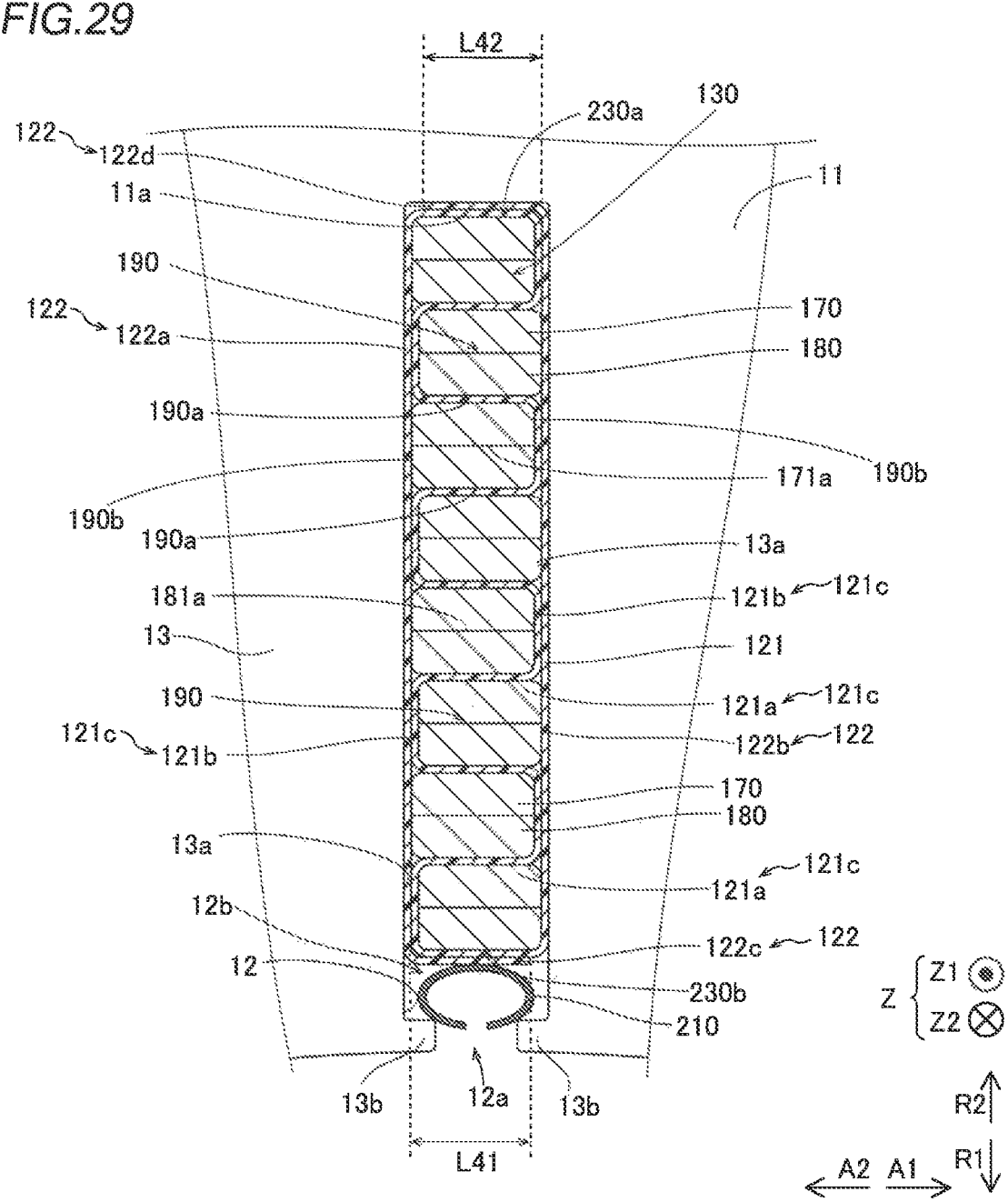
FIG. 29 is a sectional drawing showing a configuration of an insulating member according to the second embodiment.

As shown in FIG. 29, between the coils adjacent to each other in the radial direction in one slot 12, the sheet-shaped insulating member 121 is provided so as to insulate the contact portions 190 from each other. Here, in each contact portion 190, the first leg portion 171 in which the conductor surface 140b (see FIG. 24) is exposed and the second leg portion 181 in which the conductor surface 140b is exposed are in contact without a bonding agent being interposed therebetween. Specifically, the insulating member 121 is provided between each of the plurality of (eight in the second embodiment) coils (a set of the first leg portion 171 and the second leg portion 181 that are in contact with each other) disposed in the radial direction in the slot 12.

Specifically, the insulating member 121 is formed by folding one sheet-shaped insulating member such as a Nomex. The insulating member 121 includes: facing surface insulating parts 121a that cover facing surfaces 190a of the contact portions 190 that are adjacent in the radial direction; and a circumferential surface insulating part 121b that is continuous from both end portions of the facing surface insulating part 121a in the circumferential direction and that covers one of the circumferential surfaces 190b of the contact portions 190 that are adjacent in the radial direction for at least the insulation distance. The facing surfaces 190a of the contact portions 190 mean an outer radial surface and an inner radial surface of the contact portions 190, which face each other in the radial direction. Further, the insulation distance is a length along the radial direction of the circumferential surface insulating part 121b and means a distance (creepage distance) sufficient for insulating the contact portions 190 adjacent to each other in the radial direction. The circumferential surfaces 190b mean surfaces of the contact portions 190 that intersect with the circumferential direction. In other words, the circumferential surfaces 190b mean surfaces extending in the radial direction and the axial direction.

In addition, the insulating member 121 includes the contact portion insulating parts 121c that are formed such that the following are continuous: the facing surface insulating part 121a on the outer radial side among a pair of the facing surface insulating parts 121a disposed adjacent to each other in the radial direction; the circumferential surface insulating part 121b provided on one side in the circumferential direction; the facing surface insulating part 121a on the inner radial side among the pair of the facing surface insulating parts 121a; and the circumferential surface insulating part 121b provided on the other side in the circumferential direction.

Further, the stator 200 includes a core leg portion insulating part 122 that is provided between the slot 12 and the coil portion 130 and that is integrally formed with the contact portion insulating part 121c. That is, the core leg portion insulating part 122 has a sheet shape similar to the contact portion insulating part 121c and is made of the same material as the contact portion insulating part 121c. Further, the contact portion insulating part 121c and the core leg portion insulating part 122 have the same thickness (not shown). Further, the contact portion insulating part 121c and the core leg portion insulating part 122 have the same length in the axial direction.

Specifically, the core leg portion insulating part 122 has the one side insulating part 122a that is continuous with the facing surface insulating part 121a on the outermost radial side and that is provided, on one side of the slot 12 in the circumferential direction (left side in FIG. 29), between the slot 12 (circumferential side surface 13a) and the coil portion 130 (circumferential surface 190b). Further, the core leg portion insulating part 122 has the other side insulating part 122b that is continuous with the facing surface insulating part 121a on the innermost radial side and that is provided, on the other side of the slot 12 in the circumferential direction (right side in FIG. 29), between the slot 12 (circumferential side surface 13a) and the coil portion 130 (circumferential surface 190b).

More specifically, in the one side insulating part 122a (other side insulating part 122b), the following parts are alternated along the radial direction: the part the is sandwiched between the circumferential side surface 13a of the slot 12 and the circumferential surface 190b of the coil portion 130; and the part sandwiched between the circumferential side surface 13a of the slot 12 and the circumferential surface insulating part 121b that covers the circumferential surface 190b of the coil portion 130.

Further, the one side insulating part 122a extends from an outer radial side end portion 230a of the coil portion 130 in the slot 12 to an inner radial side end portion 230b (so as to extend over the end portion 230b). The other side insulating part 122b extends from the inner radial side end portion 230b of the coil portion 130 in the slot 12 to the outer radial side end portion 230a (so as to extend over the end portion 230a). That is, the coil portion 130 in the slot 12 is provided so as to be surrounded by the facing surface insulating part 121a on the outermost radial side, the facing surface insulating part 121a on the innermost radial side, the one side insulating part 122a, and the other side insulating part 122b.

The core leg portion insulating part 122 includes an inner radial side insulating part 122c that is continuous with the one side insulating part 122a and that is provided so as to cover the facing surface insulating part 121a on the innermost radial side from the inner radial side. Further, the core leg portion insulating part 122 has an outer radial side insulating part 122d that is continuous with the other side insulating part 122b and that is provided so as to cover the facing surface insulating part 121a on the outermost radial side from the outer radial side.

Specifically, the inner radial side insulating part 122c is provided so as to be sandwiched between the facing surface insulating part 121a on the innermost radial side and the spring member 210. That is, the coil portion 130 and the spring member 210 are insulated from each other by the facing surface insulating part 121a on the innermost radial side and the inner radial side insulating part 122c. The outer radial side insulating part 122d is provided so as to be sandwiched between the facing surface insulating part 121a on the outermost radial side and the wall portion 11a of the slot 12. That is, the coil portion 130 and the wall portion 11a (stator core 10) of the slot 12 are insulated from each other by the facing surface insulating part 121a on the outermost radial side and the outer radial side insulating part 122d.

Further, the inner radial side insulating part 122c has a length L41 in the circumferential direction. Further, the outer radial side insulating part 122d has a length L42 in the circumferential direction. Each of the length L41 of the inner radial side insulating part 122c and the length L42 of the outer radial side insulating part 122d is greater than half the width W2 of the slot 12 (see FIG. 3), for example.

In addition, as shown in FIG. 27, each of the contact portion insulating part 121c and the core leg portion insulating part 122 is disposed such that edge portions on both sides in the axial direction protrude outward from the end faces (10a, 10b) of the stator core 10 in the axial direction. As a result, each of the contact portion insulating part 121c and the core leg portion insulating part 122 is provided across the entire slot 12, in the axial direction.

Figure 30:
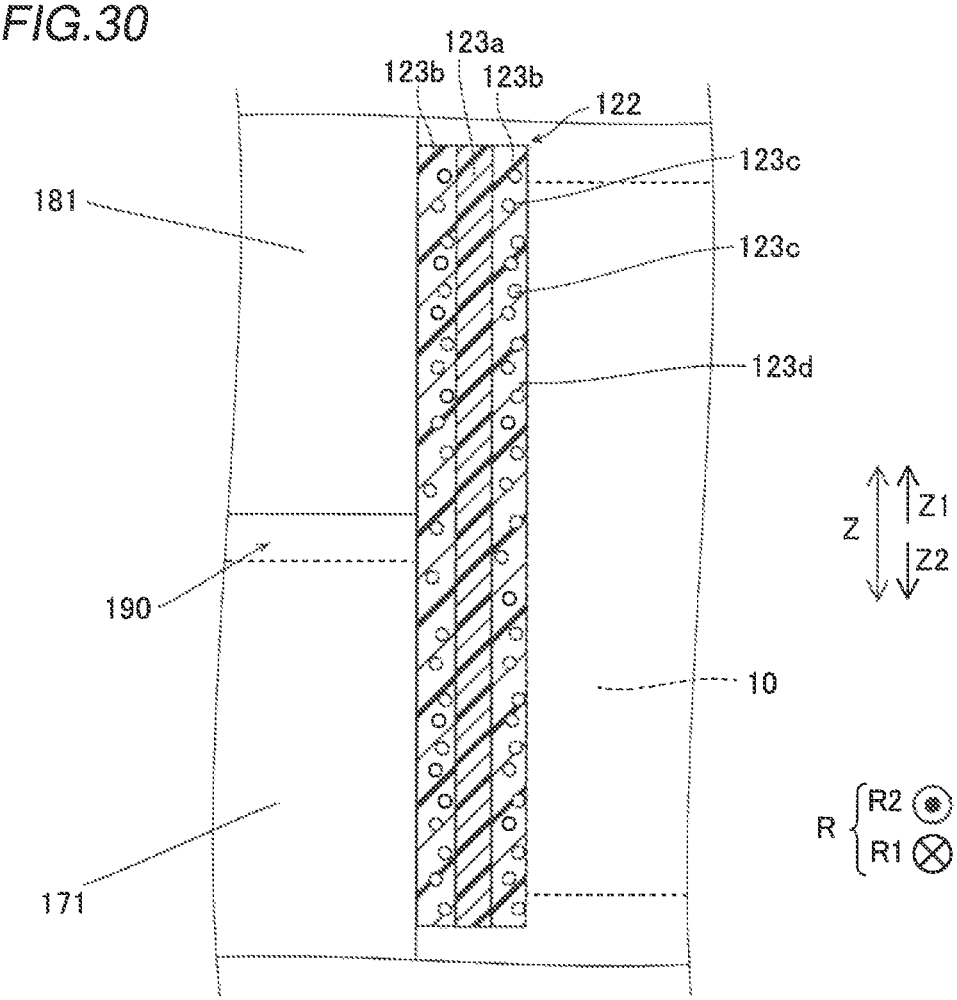
FIG. 30 is a sectional drawing showing a configuration of an insulating layer and a fixing layer of a core leg portion insulating part according to the second embodiment.

As shown in FIG. 30, the core leg portion insulating part 122 includes an insulating layer 123a and a fixing layer 123b that includes a foaming agent 123c that foams due to heat. The foaming agent 123c foams and expands so as to fix each of the first leg portion 171 and the second leg portion 181 in at least the axial direction with respect to the stator core 10. The fixing layer 123b of the core leg portion insulating part 122 is configured to bond and fix each of the first leg portion 171 and the second leg portion 181 to the stator core 10. The fixing layer 123b is provided on both surfaces of the insulating layer 123a. When the fixing layer 123b is heated, a thermosetting resin 123d is cured. Thus, it is not necessary to use a varnish or the like to fix each of the first leg portion 171 and the second leg portion 181. In FIG. 30, in order to highlight the core leg portion insulating part 122, the core leg portion insulating part 122 is illustrated so as to have a thickness greater than the actual thickness. In FIG. 30, the illustration of the stator core 10 and the like is omitted for simplification. Since the insulating layer 123a and the fixing layer 123b have the same configurations (materials) as the insulating layer 20a and the fixing layer 20c of the first embodiment described above, detailed description thereof will be omitted. Further, although not shown, the contact portion insulating part 121c also has the same configuration (composition) as the core leg portion insulating part 122.

(Stator Manufacturing Process)

Next, with reference to FIG. 31, a manufacturing method of the stator 200 will be described.

Figure 31:
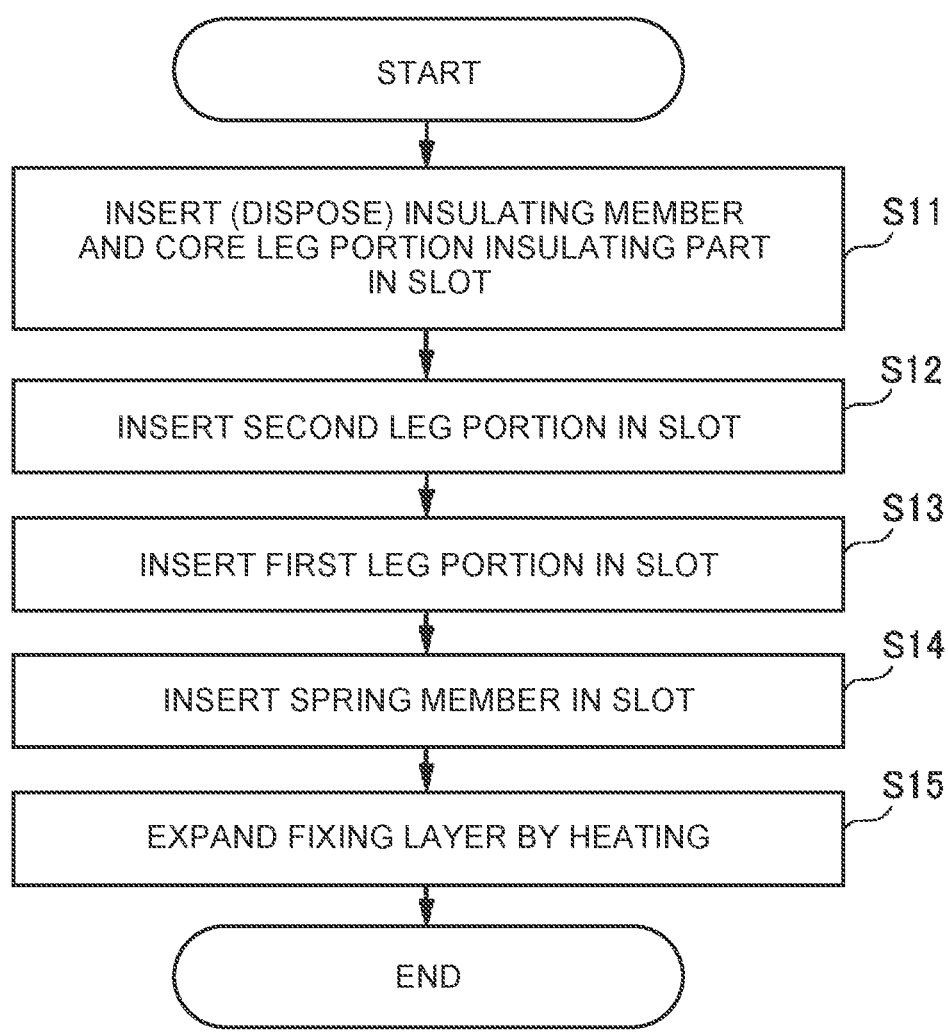
FIG. 31 is a flow diagram for describing a manufacturing method of the stator according to the second embodiment.

As shown in FIG. 31, first, in step S11, the insulating member 121 (contact portion insulating part 121c) and the core leg portion insulating part 122 are integrally inserted (disposed) in the slot 12.

Next, in step S12, the second leg portion 181 (see FIGS. 26A and 26B) of the second conductor 180 is inserted in the slot 12 from the other side (Z1 direction side) in the axial direction.

Next, in step S13, the first leg portion 171 (see FIGS. 25A and 25B) of the first conductor 170 is inserted in the slot 12 from one side (Z2 direction side) in the axial direction. At this time, the first leg portion 171 is disposed such that the first surface 171a of the first leg portion 171 and the second surface 181a of the second leg portion 181 face each other.

Next, in step S14, the spring member 210 (see FIG. 27) is inserted in the slot 12 from the inner radial side through the opening portion 12a of the slot 12.

Then, in step S15, the stator core 10 is heated and the fixing layer 123b is heated and thus, the foaming agent 123c is foamed and the fixing layer 123b is expanded. In this way, the coil portion 130 is fixed to the slot 12 at least in the axial direction.

The other configurations of the second embodiment are the same as those of the first embodiment described above.

[Effects of First and Second Embodiments]

In the first and second embodiments, the following effects can be obtained.

In the first and second embodiments, as described above, between the first segment conductor (70, 170) and the second segment conductor (80, 180) that are joined to each other at the joint portions (90, 190), the first clearance portion (74, 171f) is provided between the tip end portion (71c, 171c) of the first leg portion (71, 171) and the second leg portion body portion (81d, 181d) in the axial direction. Further, the second clearance portion (84, 181f) is provided between the tip end portion (81c, 181c) of the second leg portion (81, 181) and the first leg portion body portion (71d, 171d) in the axial direction. The term "joining" has a broad meaning including not only a state of being joined via a binder (joining material) but also a state of being only in contact without interposing a binder (joining material).

As a result, even if there is a dimensional variation that occurs while manufacturing the first segment conductor (70, 170) and the second segment conductor (80, 180), the above variation can be absorbed by the first clearance portion (74, 171f) and the second clearance portion (84, 181f). As a result, the following case can be prevented: the tip end portion (71c, 81c, 171c, 181c) of the conductor (70, 80, 170, 180) that is manufactured to have a relatively large dimension, among the first segment conductors (70, 170) and the second segment conductors (80, 180), is in contact with the conductor (70, 80, 170, 180) to be joined with and thus, movement of the other first segment conductors (70, 170) and the second segment conductors (80, 180) in the axial direction is stopped. As a result, even when the height of each of the coil end portions (72, 82, 172, 182) of the first segment conductor (70, 170) and the second segment conductor (80, 180) are aligned, the conductors (70, 80, 170, 180) that are manufactured to have relatively small dimensions, among the first segment conductor (70, 170) and the second segment conductor (80, 180), can be easily brought into contact with the conductors (70, 80, 170, 180) to be joined with, in the joint portion (90, 190). As a result, even when there is a variation in the dimensions of the first segment conductor (70, 170) and the second segment conductor (80, 180), it is possible to ensure a joining area of the first leg portion (71, 171) and the second leg portion (81, 181) while making the protrusion amount of each coil end portion (72, 82, 172, 182) of the first segment conductor (70, 170) and the second segment conductor (80, 180) uniform.

Since the first clearance portion (74, 171f) and the second clearance portion (84, 181f) are provided, the first segment conductor (70, 170) and the second segment conductor (80, 180) can be prevented from being contact in the axial direction. As a result, even when there is the conductor (70, 80, 170, 180) that is manufactured to have a size larger than a design size, among the first segment conductor (70, 170) and the second segment conductor (80, 180), the first segment conductor (70, 170) (first leg portion (71, 171)) and the second segment conductor (80, 180) (second leg portion (81, 181)) can be prevented from being disposed on an outer side of a predetermined position in the axial direction.

Further, even when there is an assembly variation when assembling the first segment conductor (70, 170) and the second segment conductor (80, 180), the above variation can be absorbed by the first clearance portion (74, 171f) and the second clearance portion (84, 181f).

Further, in the first and second embodiments, as described above, each of the first surface (71a, 171a) and the second surface (81a, 181a) is joined to a portion of each other in the joint portion (90, 190). Further, the lengths (L4, L5) of the first surface (71a, 171a) and the second surface (81a, 181a) in the axial direction are larger than the length (L6) of the joint portion (90, 190) in the axial direction. With such a configuration, each of the first clearance portion (74, 171f) and the second clearance portion (84, 181f) can be easily formed.

Further, in the first and second embodiments, as described above, each of the first surface (71a, 171a) and the second surface (81a, 181a) extends parallel to the axial direction and is provided so as to face each other in the radial direction. Further, the first surface (71a, 171a) and the second surface (81a, 181a) are joined to each other in the radial direction. With this configuration, since each of the first surface (71a, 171a) and the second surface (81a, 181a) extends parallel to the axial direction, the first surface (71a, 171a) and the second surface (81a, 181a) can be easily assembled without interfering with each other in the axial direction. Further, since the slots (12) in which the first leg portion (71, 171) and the second leg portion (81, 181) are disposed are open in the radial direction, by joining the first surface (71a, 171a) and the second surface (81a, 181a) to each other in the radial direction, it is possible to easily press the joint portion (90, 190) with the pressing member (spring member 210) via the part of each slot (12) that is open in the radial direction.

Further, in the first and second embodiments, as described above, the length (L7) of the first clearance portion (74, 171f) in the axial direction and the length (L8) of the second clearance portion (84, 181f) in the axial direction are both larger than the thickness (t2) of the first surface disposition portion (71b, 171b) provided with the first surface (71a, 171a) of the first leg portion (71, 171) and the thickness (t4) of the second surface disposition portion (81b, 181d) provided with the second surface (81a, 181a) of the second leg portion (81, 181), in the direction (radial direction) in which the first surface (71a, 171a) and the second surface (81a, 181a) are joined. With this configuration, since both the length (L7) of the first clearance portion (74, 171f) in the axial direction and the length (L8) of the second clearance portion (84, 181f) in the axial direction are increased, it is possible to more surely absorb the dimensional variation and the assembly variation described above.

Further, in the first and second embodiments, as described above, each of the first clearance portion (74, 171f) and the second clearance portion (84, 181f) is disposed in the slot (12). With this configuration, compared to the case in which each of the first clearance portion (74, 171f) and the second clearance portion (84, 181f) is disposed outside the slot (12), the length of the coil portion (30, 130) in the axial direction can be suppressed from being increased.

Further, in the first embodiment, as described above, each of the first clearance portion (74) and the second clearance portion (84) is provided closer to the one side end face (10a) of the armature core (10) in the axial direction than the axial center (C2) of the armature core (10). With this configuration, the first surface (71a) and the second surface (81a) can be joined in the vicinity of the one side end face (10a). Here, since the vicinity of the one-side end face (10a) is a part through which lubricating oil passes, the heat generated at the joint portion (90) can be cooled by the above oil described above. Further, in the first surface disposition portion (71b) provided with the first surface (71a) of the first leg portion (71) and the second surface disposition portion (81b) provided with the second surface (81a) of the second leg portion (81) are provided, the thickness (t2, t4) in the direction (radial direction) in which the first surface (71a) and the second surface (81a) is relatively small. Thus, the current density becomes relatively high and the heating value becomes relatively large. Therefore, in such a configuration, joining the first surface (71a) and the second surface (81a) in the vicinity of the one side end face (10a) is part effective in efficiently cooling the part in which the heating value is large. The meaning of the vicinity of the one-side end face (10a) includes both the position of the one-side end face (10a) itself and the vicinity of the one-side end face (10a).

Further, in the first embodiment, as described above, each of the first segment conductor (70) and the second segment conductor (80) has a U shape including the pair of first leg portions (71) and the pair of second leg portions (81), respectively. The pair of first leg portions (71) and the pair of second leg portions (81) have different lengths from each other in the axial direction. Each of the first clearance portion (74) and the second clearance portion (84) are provided in the vicinity of the one side end face (10*a*) by the first surface (71*a*) of the pair of first leg portions (71) and the second surface (81*a*) of the pair of second leg portions (81) being joined. With this configuration, it is possible to easily provide each of the first clearance portion (74) and the second clearance portion (84) in the vicinity of the end face 10*a*, just by making the lengths of the pair of first leg portions (71) and the pair of second leg portions (81) in the axial direction different from each other.

Further, in the first embodiment, as described above, the conductive adhesive (91) is applied to the part (71*i*), which faces the second clearance portion (84) when viewed from the radial direction in which the first surface (71*a*) and the second surface (81*a*) are joined, of the first surface (71*a*), and the part (81*i*), which faces the first clearance portion (74) when viewed from the radial direction, of the second surface (81*a*), in addition to the part (71*e*, 81*e*) corresponding to the joint portion (90), of at least one of the first surface (71*a*) and the second surface (81*a*). With this configuration, even when the first leg portion (71) and the second leg portion (81) are displaced in the axial direction from the predetermined positions, the first surface (71*a*) and the second surface (81*a*) can be joined by the conductive adhesive (91) that is applied to the part (71*i*) of the first surface (71*a*) facing the first clearance portion (74) and the part (81*i*) of the second surface (81*a*) facing the second clearance portion (84) when viewed from the joining direction (diameter direction) in which the first surface (71*a*) and the second surface (81*a*) are joined. As a result, even when the first leg portion (71) and the second leg portion (81) are displaced in the axial direction from the predetermined positions, the joining area of the first surface (71*a*) and the second surface (81*a*) can be ensured.

Further, in the first and second embodiments, as described above, in the one slot (12), the plurality of first surface disposition portions (71*b*, 171*b*) each provided with the first surface (71*a*, 171*a*) of the first leg portion (71, 171) and the plurality of second surface disposition portions (81*b*, 181*d*) each provided with the second surface (81*a*, 181*a*) of the second leg portion (81, 181) are arranged alternately along the radial direction. Each of the first clearance portion (74, 171*f*) and the second clearance portion (84, 181*f*) is provided for each set of the first leg portion (71, 171) and the second leg portion (81, 181) that are joined to each other. With this configuration, in all the sets of the first leg portion (71, 171) and the second leg portion (81, 181) that are joined to each other in the one slot (12), with the first clearance portion (74, 171*f*) and the second clearance portion (84, 181*f*), the dimensional variation and the assembly variation described above can be absorbed.

Further, in the first and second embodiments, as described above, the joint portion insulating member (21, 121) is provided to extend in the axial direction so as to cover both the first clearance portion (74, 171*f*) and the second clearance portion (84, 181*f*) when viewed from the radial direction. With this configuration, it is possible to prevent the adjacent joint portions (90, 190) from conducting with each other via the first clearance portion (74, 171*f*) and the second clearance portion (84, 181*f*).

Further, in the first embodiment, as described above, the first surface disposition portion (71*b*) is provided so as to be continuous with the first leg portion body portion (71*d*) via the first step portion (71*g*) including the corner portion inner surface (71*f*) that faces the second clearance portion (84) and that has a round shape. The second surface disposition portion (81*b*) is provided so as to be continuous with the second leg portion body portion (81*d*) via the second step portion (81*g*) including the corner portion inner surface (81*f*) that faces the first clearance portion (74) and that has a round shape. With this configuration, since the first step portion (71*g*) and the second step portion (81*g*) are provided with the corner portion inner surface (71*f*) and the corner portion inner surface (81*f*) having a round shape, respectively, it is possible to suppress the concentration of stress in the first step portion (71*g*) and the second step portion (81*g*) at the time of joining and after joining of the first surface (71*a*) and the second surface (81*a*). As a result, even when the second clearance portion (84) and the first clearance portion (74) are provided so as to face each of the corner portion inner surface (71*f*) and the corner portion inner surface (81*f*), respectively, it is possible to suppress the concentration of stress in each of the first step portion (71*g*) and the second step portion (81*g*) and prevent the first leg portion (71) and the second leg portion (81) from being damaged.

Further, in the first embodiment, as described above, each of the tip end portion (71*c*, 171*c*) of the first leg portion (71, 171) and the tip end portion (81*c*, 181*c*) of the second leg portion (81, 181) have a tapered shape. With this configuration, when the first leg portion (71, 171) and the second leg portion (81, 181) are inserted in the slot (12) in the axial direction so as that the first surface (71*a*, 171*a*) and the second surface (81*a*, 181*a*) are joined, the tip end portion (71*c*, 171*c*) of the first leg portion (71, 171) and the tip end portion (81*c*, 181*c*) of the second leg portion 81 can be suppressed from interfering with each other.

Further, in the first and second embodiments, as described above, the step of disposing the first segment conductor (70, 170) and the second segment conductor (80, 180) is the step of disposing the step of disposing the first segment conductor (70, 170) and the second segment conductor (80, 180) so that the first clearance portion (74, 171*f*) is provided between the tip end portion (71*c*, 171*c*) of the first leg portion (71, 171) and the second leg portion body portion (81*d*, 181*d*) in the axial direction and so that the second clearance portion (84, 181*f*) is provided between the tip end portion (81*c*, 181*c*) of the second leg portion (81, 181) and the first leg portion body portion (71*d*, 171*d*) in the axial direction.

As a result, even if there is a dimensional variation that occurs while manufacturing the first segment conductor (70, 170) and the second segment conductor (80, 180), the above variation can be absorbed by the first clearance portion (74, 171*f*) and the second clearance portion (84, 181*f*). As a result, the following case can be prevented: the tip end portion (71*c*, 81*c*, 171*c*, 181*c*) of the conductor that is manufactured to have a relatively large dimension, among the plurality of first segment conductors (70, 170) and the second segment conductors (80, 180), is in contact with the conductor (70, 80, 170, 180) to be joined with and thus, movement of the other first segment conductors (70, 170) and the second segment conductors (80, 180) in the axial direction is stopped. As a result, even when the height of each of the coil end portions (72, 82, 172, 182) of the first segment conductor (70, 170) and the second segment conductor (80, 180) are aligned, the conductors (70, 80, 170, 180) that are manufactured to have relatively small dimensions, among the first segment conductor (70, 170) and the second segment conductor (80, 180), can be easily brought into contact with the conductors (70, 80, 170, 180) to be joined with, in the joint portion (90, 190). As a result, even when there is a variation in the dimensions of the first segment conductor (70, 170) and the second segment conductor (80, 180), it is possible to provide the manufacturing method of the armature (100, 200) in which it is possible to ensure a joining area of the first leg portion (71, 171) and the second leg portion (81, 181) while making the protrusion amount of each coil end portion (72, 82, 172, 182) of the first segment conductor (70, 170) and the second segment conductor (80, 180) uniform.

[Modifications] It should be considered that the embodiments presently disclosed are exemplifications in all points and are not restrictive. The scope of the present disclosure is shown by the scope of the claims and not by the above description of the embodiments, and further includes the meanings equivalent to the scope of the claims and all changes (modifications) within the scope.

For example, in the first and second embodiments described above, an example is shown in which each of the first surface 71a (171a) and the second surface 81a (181a) extends parallel to the axial direction. However, the present disclosure is not limited to this. Each of the first surface 71a (171a) and the second surface 81a (181a) may be tilted by a predetermined angle (for example, 5 degrees or less) with respect to the axial direction.

Further, in the first and second embodiments described above, an example is shown in which the first surface 71a (171a) and the second surface 81a (181a) are joined to each other in the radial direction. However, the present disclosure is not limited to this. The first surface 71a (171a) and the second surface 81a (181a) may be joined in a direction intersecting the radial direction (for example, the circumferential direction).

Further, in the first and second embodiments described above, an example is shown in which both lengths (L7, L8) of the first clearance portion 74 (171f) and the second clearance portion 84 (181f) in the axial direction are larger than the thickness (t2, t4) of the first surface disposition portion 71b (171b) and the second surface disposition portion 81b (181b) in the radial direction. However, the present disclosure is not limited to this. The length (L7 or L8) of one of the first clearance portion 74 (171f) and the second clearance portion 84 (181f) in the axial direction may be larger than the thickness (t2, t4) of the first surface disposition portion 71b (171b) and the second surface disposition portion 81b (181b) in the radial direction.

Figure 32:
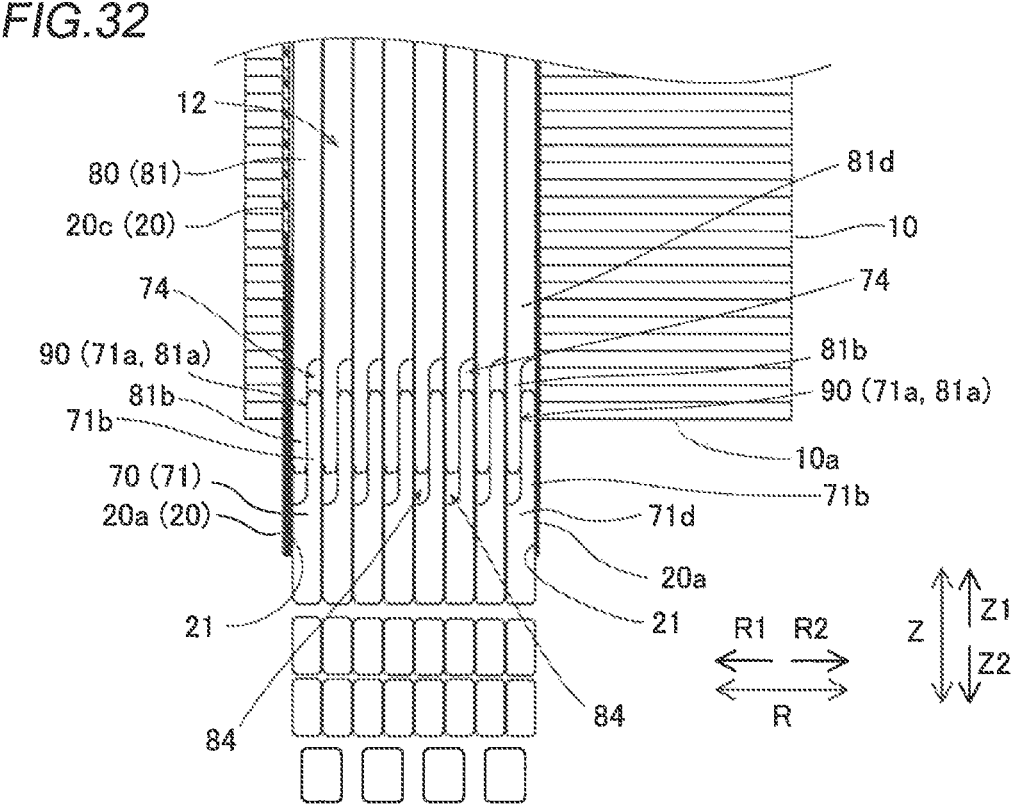
FIG. 32 is a sectional view near a joint portion according to a first modification of the first embodiment.
Figure 33:
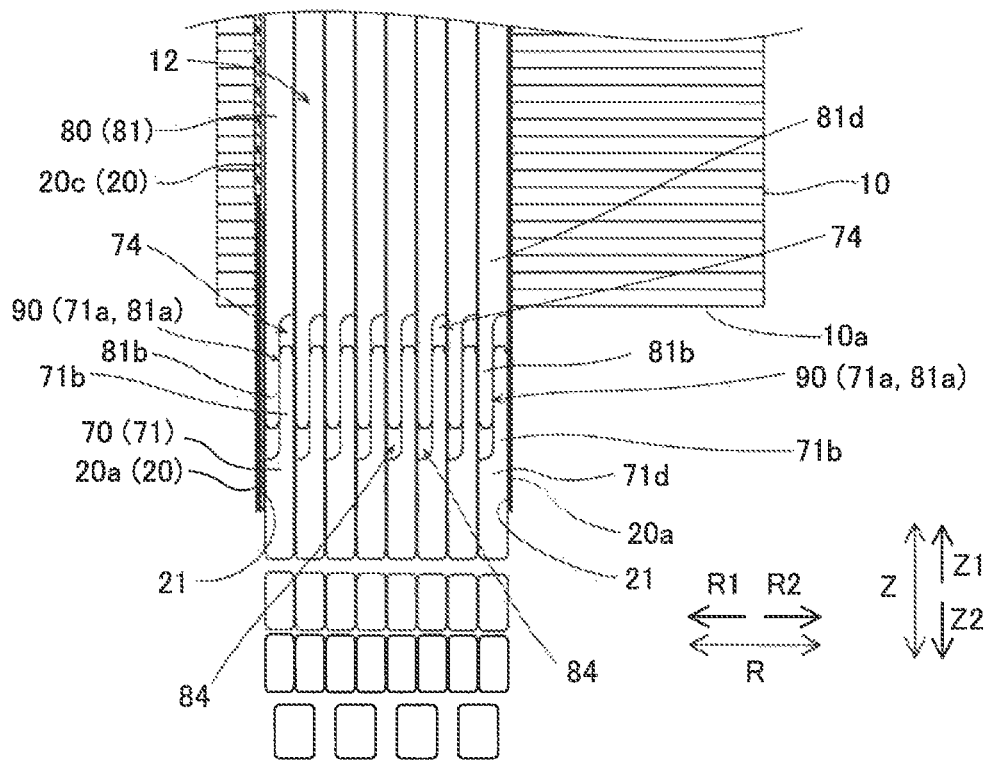
FIG. 33 is a sectional view near a joint portion according to a second modification of the first embodiment.

Further, in the first embodiment described above, an example is shown in which each of the first clearance portion 74 and the second clearance portion 84 is disposed in the slot 12. However, the present disclosure is not limited to this. For example, a part of the first clearance portion 74 and the second clearance portion 84 (for example, only the second clearance portion 84) may be disposed outside the slot 12 (see FIG. 32), or the entirety of both the first clearance portion 74 and the second clearance portion 84 and the second clearance portion 84 may be disposed outside the slot 12 (see FIG. 33).

Figure 34A:
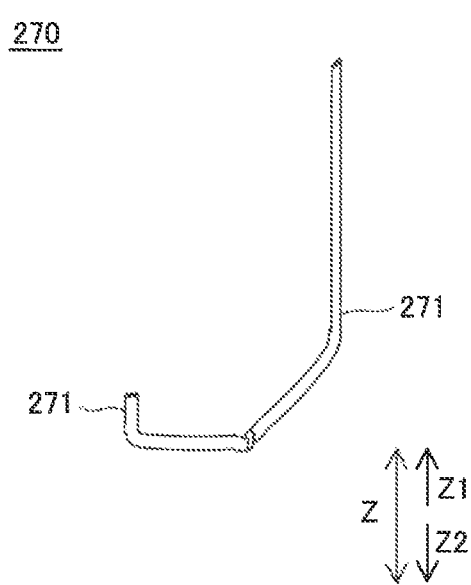
(FIG. 34A is a perspective view of the first segment conductor viewed from the outer radial side.
Figure 34B:
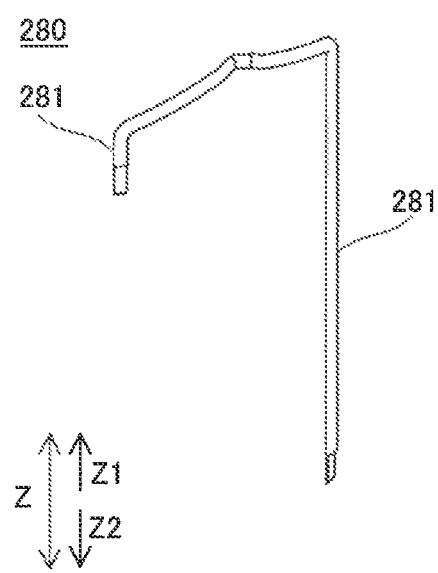
FIG. 34B is a perspective view of the second segment conductor viewed from the outer radial side.)

Further, in the first embodiment described above, an example is shown in which each of the first clearance portion 74 and the second clearance portion 84 is disposed in the vicinity of the end face 10a (one side end face). However, the present disclosure is not limited to this. For example, each of the first clearance portion 74 and the second clearance portion 84 may be disposed in the vicinity of the end face 10a (one side end face) and the end face 10b (other side end face). In this case, as shown in FIG. 34, a pair of first leg portions 271 of a first segment conductor 270 is configured so that the first leg portions 271 have different lengths from each other (see FIG. 34A), and a pair of second leg portions 281 of a second segment conductor 280 is configured so that the second leg portions 281 have different lengths from each other (see FIG. 34B). That is, each of the first segment conductor 270 and the second segment conductor 280 has a J-shape (substantially J-shape).

Further, in the second embodiment described above, an example is shown in which the contact portion 190 (joint portion) is disposed in the vicinity of the central portion in the axial direction, in the slot 12. However, the present disclosure is not limited to this. For example, the contact portion 190 (joint portion) may be disposed in the vicinity of the end face 10a (one side end face) and the end face 10b (other side end face).

Further, in the first embodiment described above, an example is shown in which the length of the second leg portion 81 is longer than the length of the first leg portion 71. However, the present disclosure is not limited to this. For example, the length of the second leg portion 81 may be shorter than the length of the first leg portion 71. Further, in the second embodiment described above, the length L31 of the first leg portion 171 and the length L32 of the second leg portion 181 may be different from each other.

Further, in the first embodiment described above, an example is shown in which the second conductor 80 having a long leg portion is a conductor on the lead side, and the first conductor 70 having a short leg portion is the conductor on the non-lead side. However, the present disclosure is not limited to this. For example, the second conductor 80 having a long leg portion may be the conductor on the non-lead side, and the first conductor 70 having a short leg portion may be the conductor on the lead side. Further, in the second embodiment described above, the second conductor 180 may be the conductor on the non-lead side, and the first conductor 170 may be the conductor on the lead side.

Further, in the first embodiment described above, an example is shown in which the conductive adhesive 91 is applied to the entirety of each of the surface part 71i (the part facing the second clearance portion) and the surface part 81i (the part facing the first clearance portion). However, the present disclosure is not limited to this. For example, the conductive adhesive 91 may be applied only to a portion of each of the surface part 71i (the part facing the second clearance portion) and the surface part 81i (the part facing the first clearance portion). Further, the conductive adhesive 91 does not have to be applied to each of the surface part 71i (the part facing the second clearance portion) and the surface part 81i (the part facing the first clearance portion).

In the first embodiment described above, an example is shown in which the corner portion inner surface 71f and the corner portion inner surface 81f have an arc shape with a curvature radius smaller than the thickness t2 of the first surface disposition portion 71b in the radial direction and the thickness t4 of the second surface disposition portion 81b in the radial direction, respectively. However, the present disclosure is not limited to this. The corner portion inner surface 71f and the corner portion inner surface 81f may have an arc shape with a curvature radius equal to or more than the thickness t2 of the first surface disposition portion 71b in the radial direction and the thickness t4 of the second surface disposition portion 81b *in the radial direction, respectively.*

In the first embodiment above described, an example is shown in which the first insulating member 20 including the fixing layer 20c configured as the adhesive layer is used. However, the present disclosure is not limited to this. For example, by using a first insulating member 20 including an expansive material (expansion layer) different from the adhesive layer, the wall portion 11a and the circumferential side surface 13a and the second leg portion 81 may be pressed against each other (pressing force) without being adhered, to be fixed. The same configuration may be used in the second embodiment described above.

Further, in the embodiment described above, an example is shown in which the first insulating member 20 and the second insulating member 21 (joint portion insulating member) have a sheet shape. However, the present disclosure is not limited to this. It is possible to apply the present disclosure to a stator having the first insulating member 20 and the second insulating member 21 that do not have a sheet shape. Similarly, each of the insulating member 121 (joint portion insulating member) and the core leg portion insulating part 122 of the second embodiment described above may not be configured to have a sheet shape.

DESCRIPTION OF REFERENCE NUMERALS

10 Stator core (armature core)
10a End face (one side end face)
10b End face (other side end face)
12 Slot
21 Second insulating member (joint portion insulating member)
30, 130 Coil portion
40, 140 Segment conductor
70, 170, 270 First conductor
71, 171, 271 First leg portion
71a, 171a First surface
71b, 171b First surface disposition portion
71c, 171c Tip end portion (tip end portion of first leg portion)
71d, 171d First leg portion body portion
71f Corner portion inner surface (corner portion inner surface of first step portion)
71g First step portion
71i Surface part (part facing second clearance portion)
74, 171f First clearance portion
80, 180 Second conductor
81, 181 Second leg portion
81a, 181a Second surface
81b, 181b Second surface disposition portion
81c, 181c Tip end portion (tip end portion of second leg portion)
81d, 181d Second leg portion body portion
81f Corner portion inner surface (corner portion inner surface of second step portion)
81g Second step portion
81i Surface part (part facing first clearance portion)
84, 181f Second clearance portion
90 Joint portion
91 Conductive adhesive
100, 200 Stator (armature)
121 Insulating member (joint portion insulating member)
190 Contact portion (joint portion)
C2 Axial center (center)
L1 Length (length of first leg portion)
L2 Length (length of second leg portion)
L4 Length (length of first surface)
L5 Length (length of second surface)
L6 Length (length of joint portion)
L7 Length (length of first clearance portion)
L8 Length (length of second clearance portion)
t2 Thickness (thickness of first surface disposition portion)
t3 Thickness (thickness of first leg portion body portion)
t4 Thickness (thickness of second surface disposition portion)
t5 Thickness (thickness of second leg portion body portion)

The invention claimed is:

1. An armature comprising:
an armature core provided with a plurality of slots extending in an axial direction;
a plurality of first segment conductors disposed on one side of the armature core in the axial direction and including a first leg portion that extends to the other side of the armature core in the axial direction;
a plurality of second segment conductors disposed on the other side of the armature core in the axial direction and including a second leg portion that extends to the one side in the axial direction; and
a coil portion including a joint portion in which a first surface that is provided on a tip end portion side of each first leg portion of the plurality of first segment conductors and that is provided so as to extend along the axial direction, and a second surface that is provided on a tip end portion side of each second leg portion of the plurality of second segment conductors and that is provided so as to extend along the axial direction are joined in one of the slots or on an outer side of one of the slots in the axial direction, wherein
the first leg portion has a first leg portion body portion that is provided so as to be continuous from a first surface disposition portion on which the first surface is provided and on an opposite side of the first leg portion from the tip end portion, and that has a thickness in a joining direction, which is a direction in which the first surface and the second surface are joined, larger than a thickness of the first surface disposition portion,
the second leg portion has a second leg portion body portion that is provided so as to be continuous from a second surface disposition portion on which the second surface is provided and on an opposite side of the second leg portion from the tip end portion, and that has a thickness in the joining direction larger than a thickness of the second surface disposition portion, and
between the first segment conductor and the second segment conductor that are joined to each other in the joint portion, a first clearance portion is provided between the tip end portion of the first leg portion and the second leg portion body portion in the axial direction, and a second clearance portion is provided between the tip end portion of the second leg portion and the first leg portion body portion in the axial direction.

2. The armature according to claim 1, wherein
each of the first surface and the second surface is joined to a part of each other in the joint portion, and
a length of each of the first surface and the second surface in the axial direction is larger than a length of the joint portion in the axial direction.

3. The armature according to claim 1, wherein
each of the first surface and the second surface is provided so as to extend parallel to the axial direction and so as to face each other in the radial direction, and
the first surface and the second surface are joined to each other in a radial direction.

4. The armature according to claim 1, wherein at least one of a length of the first clearance portion in the axial direction and a length of the second clearance portion in the axial direction is larger than a thickness of the first surface disposition portion and a thickness of the second surface disposition portion in the joining direction.

5. The armature according to claim 4, wherein the length of the first clearance portion in the axial direction and the length of the second clearance portion in the axial direction are both larger than the thickness of the first surface disposition portion and the thickness of the second surface disposition portion in the joining direction.

6. The armature according to claim 1, wherein each of the first clearance portion and the second clearance portion is disposed in the slot.

7. The armature according to claim 1, wherein each of the first clearance portion and the second clearance portion is provided closer to at least one of a one side end face and the other side end face than a center of the armature core in the axial direction.

8. The armature according to claim 7, wherein
each of the first segment conductor and the second segment conductor has a U-shape including a pair of the first leg portions and a pair of the second leg portions, respectively,
the pair of first leg portions and the pair of second leg portions have different lengths in the axial direction from each other, and
each of the first clearance portion and the second clearance portion is provided in a vicinity of one of the one side end face and the other side end face by the first surface of the pair of first leg portions and the second surface of the pair of second leg portions being joined.

9. The armature according to claim 1, wherein
a conductive adhesive that adheres the first surface and the second surface at the joint portion and that makes the first leg portion and the second leg portion conductive is further provided, and
the conductive adhesive is applied to at least a portion of a part of the first surface that faces the second clearance portion and at least a portion of a part of the second surface that faces the first clearance portion when viewed from the joining direction, in addition to a part corresponding to the joint portion of at least one of the first surface and the second surface.

10. The armature according to claim 1, wherein
in the one slot, a plurality of parts in which the first surface of the first leg portion is provided and a plurality of parts in which the second surface of the second leg portion is provided are arranged alternately in a radial direction, and
each of the first clearance portion and the second clearance portion is provided for each set of the first leg portion and the second leg portion that are joined to each other.

11. The armature according to claim 10, wherein
a joint portion insulating member that has a sheet shape and that insulates the joint portions adjacent to each other in the radial direction, among the joint portions, is further provided, and
the joint portion insulating member is provided so as to extend in the axial direction so as to cover both the first clearance portion and the second clearance portion when viewed from the radial direction.

12. The armature according to claim 1, wherein
the first surface disposition portion is provided so as to be continuous with the first leg portion body portion via a first step portion including a corner portion inner surface that faces the second clearance portion and that has a round shape, and
the second surface disposition portion is provided so as to be continuous with the second leg portion body portion via a second step portion including a corner portion inner surface that faces the first clearance portion and that has a round shape.

13. The armature according to claim 1, wherein each of the tip end portion of the first leg portion and the tip end portion of the second leg portion has a tapered shape.

14. A manufacturing method of an armature that includes an armature core provided with a plurality of slots extending in an axial direction, a plurality of first segment conductors including a first leg portion extending in the axial direction, and a plurality of second segment conductors including a second leg portion extending in the axial direction, the manufacturing method comprising:
a step of disposing each of the plurality of first segment conductors on one side of the armature core in the axial direction and disposing each of the plurality of second segment conductors on the other side of the armature core in the axial direction such that a first surface that is provided on a tip end portion side of each of the first leg portions of the plurality of first segment conductors and that is provided so as to extend along the axial direction and a second surface that is provided on a tip end portion side of each of the second leg portions of the plurality of second segment conductors and that is provided so as to extend along the axial direction face each other in one slot or on an outer side of the one slot in the axial direction; and
a step of joining the first surface of the first leg portion and the second surface of the second leg portion that are disposed so as to face each other, wherein
the first leg portion has a first leg portion body portion that is provided so as to be continuous from a first surface disposition portion on which the first surface is provided and on an opposite side of the first leg portion from the tip end portion, and that has a thickness in a joining direction, which is a direction in which the first surface and the second surface are joined, larger than a thickness of the first surface disposition portion,
the second leg portion has a second leg portion body portion that is provided so as to be continuous from a second surface disposition portion on which the second surface is provided and on an opposite side of the second leg portion from the tip end portion, and that has a thickness in the joining direction larger than a thickness of the second surface disposition portion, and
the step of disposing the first segment conductor and the second segment conductor is a step of disposing the first segment conductor and the second segment conductor so that a first clearance portion is provided between the tip end portion of the first leg portion and the second leg portion body portion in the axial direction and so that a second clearance portion is provided between the tip end portion of the second leg portion and the first leg portion body portion in the axial direction.

* * * * *